(12) United States Patent
Frank et al.

(10) Patent No.: US 9,667,458 B1
(45) Date of Patent: May 30, 2017

(54) FEED-FORWARD PHASE TRACKING

(71) Applicant: QUALCOMM Incorporated, San Diego, CA (US)

(72) Inventors: Georg Frank, Nuremberg (DE); Nicola Varanese, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/729,308

(22) Filed: Jun. 3, 2015

(51) Int. Cl.
  *H04K 1/10* (2006.01)
  *H04L 27/28* (2006.01)
  *H04L 27/22* (2006.01)
  *H04L 27/26* (2006.01)

(52) U.S. Cl.
  CPC .......... *H04L 27/22* (2013.01); *H04L 27/2653* (2013.01); *H04L 27/2695* (2013.01)

(58) Field of Classification Search
  CPC .. H04L 27/22; H04L 27/2695; H04L 27/2653
  See application file for complete search history.

(56) References Cited

U.S. PATENT DOCUMENTS

| | | | |
|---|---|---|---|
| 8,553,786 B2 | 10/2013 | Dick | |
| 8,897,387 B1 | 11/2014 | Eliaz | |
| 2006/0182015 A1* | 8/2006 | Kim | H04L 27/2657 370/203 |
| 2007/0265791 A1* | 11/2007 | Valadon | H04Q 1/46 702/76 |
| 2011/0222590 A1* | 9/2011 | Dick | H04L 5/0001 375/219 |
| 2011/0293049 A1* | 12/2011 | Niewczas | H04L 27/0014 375/344 |
| 2014/0146911 A1 | 5/2014 | Eliaz | |
| 2014/0177762 A1 | 6/2014 | Gotman | |
| 2014/0269861 A1 | 9/2014 | Eliaz | |

OTHER PUBLICATIONS

Huang et al., "Decision-aided Carrier Phase Estimation with Selective Averaging for Low-cost Optical Coherent Communication," 2013 9th International Conference on Information, Communications & Signal Processing, Dec. 10, 2013, 3 pgs. XP032584570, Institute of Electrical and Electronics Engineers.

(Continued)

*Primary Examiner* — Wednel Cadeau
(74) *Attorney, Agent, or Firm* — Holland & Hart LLP

(57) ABSTRACT

A device may demodulate a set of OFDM data-pilot symbols and select a subset of based at least in part on the position of each data pilot on a constellation map (e.g., how close the data pilot symbol is to an actual constellation point). The device may then perform a data-pilot-based phase estimation based at least in part on the selected subset. The device may also reduce the number of data pilots by partitioning a set of subcarriers into groups and selecting a representative subcarrier from each group. The phase estimation may then be based on the data pilots received on the selected subcarriers. In some cases, the device may also generate a smooth phase signal based on a linear regression algorithm including a phase averaging and a phase offset estimation and perform the phase estimation using the smooth phase signal.

20 Claims, 16 Drawing Sheets

(56) References Cited

OTHER PUBLICATIONS

ISA/EP, International Search Report and Written Opinion of the International Searching Authority, Int'l Application No. PCT/US2016/035257, Sep. 22, 2016, European Patent Office, Rijswijk, NL, 11 pgs.

Lee et al., "Reliable Data Aided Sparsity-Aware Approaches to Clipping Noise Estimation in OFDM Systems," Vehicular Technology Conference (VTC FALL), Sep. 3, 2012, 5 pgs, XP032294826, ISBN: 978-1-4673-1880-8, Institute of Electrical and Electronics Engineers.

* cited by examiner

FEED-FORWARD PHASE TRACKING

BACKGROUND

Field of Disclosure

The following relates generally to wireless communication, and more specifically to feed-forward phase tracking.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless network, for example a wireless local area network (WLAN) may include an access point (AP) that communicate with one or more station (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and UL. From the STA's perspective, the DL (or forward link) may refer to the communication link from the AP to the station, and the uplink (UL) (or reverse link) may refer to the communication link from the station to the AP.

Some wireless communication devices (such as APs or STAs) may utilize a combination of pilot based phase estimation and data-pilot-based phase estimation to track the phase on an incoming signal. In some cases, some of the data pilots may be affected by noise or distortion in the channel and may not be effective for use in data-pilot-based phase estimation.

SUMMARY

Systems, methods, and apparatuses for feed-forward phase tracking are described. A wireless device may demodulate a set of OFDM data-pilot symbols and select a subset of OFDM data-pilot symbols based at least in part on the position of each data pilot on a constellation map (e.g., how close the data pilot symbol is to an actual constellation point). The device may then perform a data-pilot-based phase estimation using the selected subset. The device may also reduce the number of data pilots by partitioning a set of subcarriers into groups and selecting a representative subcarrier from each group. The phase estimation may be based at least in part on the data pilots received on the selected subcarriers. In some cases, the device may also generate a smooth phase signal based at least in part on a linear regression algorithm including a phase averaging and a phase offset estimation and perform the phase estimation using the smooth phase signal.

A method of communication is described. The method may include demodulating a set of OFDM data-pilot symbols, selecting a subset of OFDM data-pilot symbols based at least in part on a position of each of the set of OFDM data-pilot symbols in a modulation constellation map, and performing a data-pilot-based phase estimation based at least in part on selecting the subset of OFDM data-pilot symbols.

An apparatus for communication is described. The apparatus may include a demodulator for demodulating a set of OFDM data-pilot symbols, a symbol filter for selecting a subset of OFDM data-pilot symbols based at least in part on a position of each of the set of OFDM data-pilot symbols in a modulation constellation map, and a phase estimator for performing a data-pilot-based phase estimation based at least in part on selecting the subset of OFDM data-pilot symbols.

A further apparatus for communication is described. The apparatus may include means for demodulating a set of OFDM data-pilot symbols; means for selecting a subset of OFDM data-pilot symbols based at least in part on a position of each of the set of OFDM data-pilot symbols in a modulation constellation map; and means for performing a data-pilot-based phase estimation based at least in part on selecting the subset of OFDM data-pilot symbols.

The method or apparatuses described above may further include processes, features, means, or instructions for calculating a distance from each of the set OFDM data-pilot symbols to a nearest constellation point in the modulation constellation map. Selecting the subset of OFDM symbols may include selecting OFDM symbols for which the distance to the nearest constellation point is less than a threshold. Additionally or alternatively, some examples may include processes, features, means, or instructions for identifying a region of the constellation map, wherein each point in the region has a phase offset from at least one axis that is less than a threshold. Selecting the subset of OFDM symbols may include selecting OFDM symbols that fall with the identified region of the constellation map. When the set of OFDM data-pilot symbols is demodulated using binary phase shift keying (BPSK) or quadrature amplitude modulation (QAM), the at least one axis is an in-phase axis. When the OFDM data-pilot symbols are demodulated using quadrature phase shift keying (QPSK), the at least one axis is an oblique axis.

The method or apparatuses described above may further include processes, features, means, or instructions for performing a channel estimation for each subcarrier in a set of subcarriers, partitioning the set of subcarriers into a plurality of groups of contiguous subcarriers, and selecting a representative subcarrier from each group based at least in part on the channel estimation corresponding to each subcarrier in the group. Additionally or alternatively, some examples may include processes, features, means, or instructions for generating a smooth phase signal based at least in part on a linear regression algorithm comprising a phase averaging and a phase offset estimation, and the data-pilot-based phase estimation is based at least in part on the smooth phase signal.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
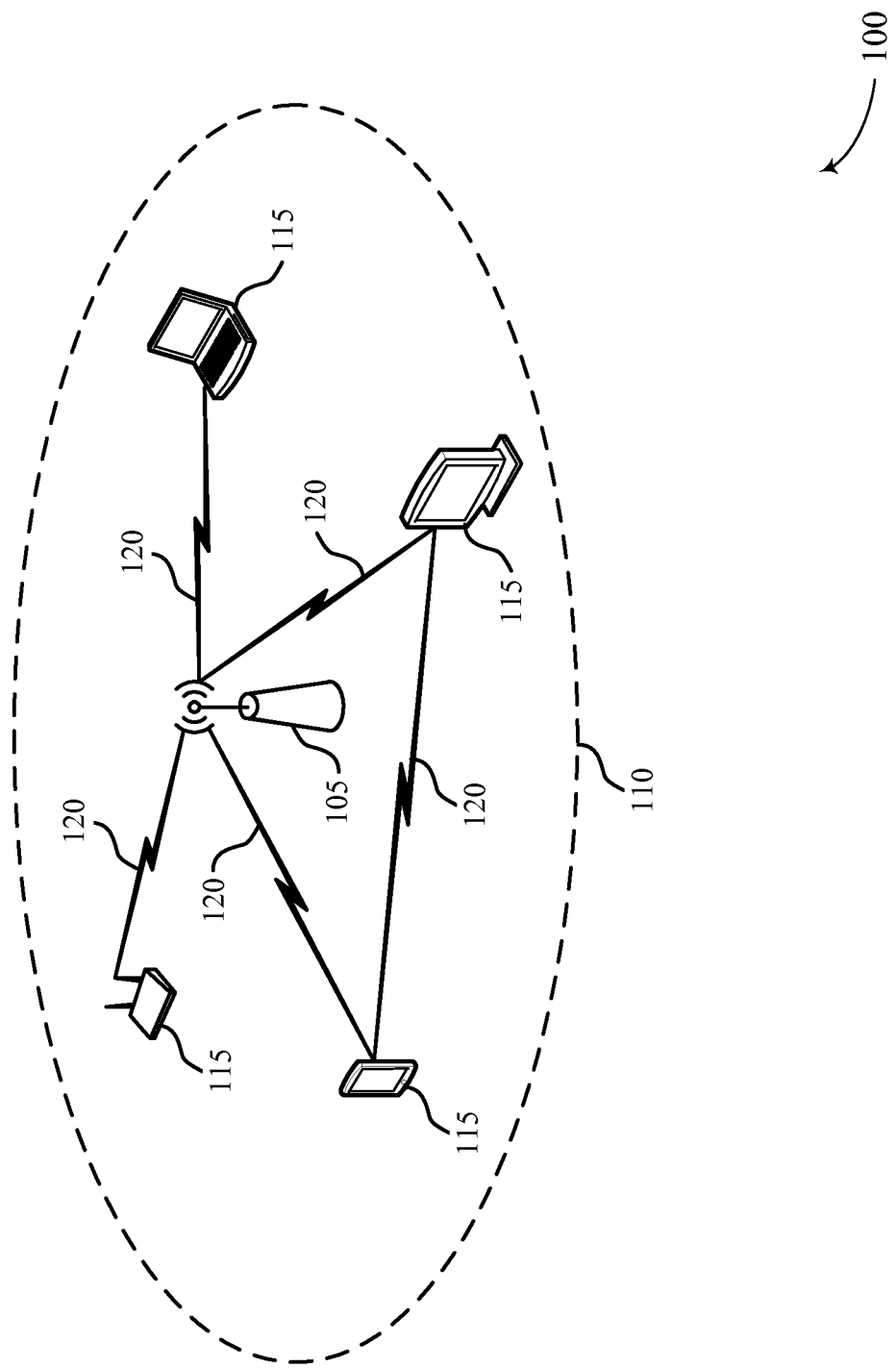
FIG. 1 illustrates a wireless local area network (WLAN) configured in accordance with various aspects of the present disclosure

The described features generally relate to improved systems, methods, or apparatuses for feed-forward phase tracking. A device may receive a number of data-pilot symbols and filter them for use in phase estimation. The filtering is based at least in part on each symbol's location within a constellation map, such as by discarding pilot symbols which do not fall within a threshold distance of an expected constellation point or do not fall within a defined region. Further, filtering may be done based at least in part on partitioning subcarriers into sub-blocks and selecting pilot symbols from representative subcarriers of each sub-block.

In some communication systems, phase and frequency offset processing is done using open loop control, such as forward correction for phase tracking. At times, frequency tracking may occur at a lower sampling rate than phase tracking (e.g., a factor of 16 lower). It may be desirable for all of the signal processing to be performed in the digital base-band (BB), such as by using a fully integrated design. For example, a frequency offset of a local oscillator (LO) may be controlled somewhere other than the analog portion of the receiver. Further, carrier frequency offset (CFO) and sampling frequency offset (SFO) may be related to the LO offset. Therefore, baseband correction of CFO may be performed in the time-domain, such as before a Fast Fourier transform (FFT) is performed. In some cases, base-band correction of SFO is performed with low complexity in the frequency-domain, such as after a FFT. The CFO may be responsible for inter-carrier interference (ICI), while the SFO may be responsible for inter-symbol interference (ISI).

In some communication systems, a maximum ratio combined (MRC) input signal is in the frequency domain, such as after a FFT, and therefore phase shift due to channel propagation is compensated. The number of pilot symbols (e.g., continual pilot symbols) may be restricted at low signal bandwidth, (e.g., around 1 or 2 MHz). As such, it may be beneficial to increase the number of pilots by adding data aided phase tracking. A data aided phase tracking scheme may be more beneficial for lower modulation orders (e.g., binary phase shift keying (BPSK), quadrature phase shift keying (QPSK), 16 quadrature amplitude modulation (QAM)), as higher modulation orders (e.g., greater than 16QAM) have a higher signal-to-noise ratio (SNR) where pilot based phase estimation is more reliable with a lower number of pilot tones.

In communication systems using data aided phase tracking, a common phase error (CPE) (e.g., caused by residual CFO, SFO, or phase noise) may be estimated for each orthogonal frequency division multiplexed (OFDM) symbol. Further, a phase slope within an orthogonal frequency division multiplexing (OFDM) symbol (or another symbol of another multiplexing scheme) from the residual sampling frequency error (SFO) is derived. At times, only two pilot subcarriers, such as pilot subcarriers with known modulation, are available. While phase tracking, it may be important to balance a low bandwidth, which allows for smoothing, with a high bandwidth which allows sufficient phase tracking capability of CPE and CFO, and allows for tracking.

Data aided phase tracking may improve performance through optimizing a phase tracking filter and improving or facilitating the selection of reliable data pilots. For example, a prediction filter may be used. In some cases, a prediction filter may include a three tap finite impulse response (FIR) phase smoothing filter, with low averaging properties which creates phase lag when a residual frequency offset is present, and a filter scheme based at least in part on linear regression, which has no residual phase error unlike a conventional low-pass filter. A three tap linear regression type tracking filter may allow for sufficient dynamic characteristics and low implementation complexities, while improving all modulation and coding schemes. A phase detector using a sectoring scheme may limit the performance gains based at least in part on the number of data pilots. Further, a simple sectoring scheme may not increase performance for higher modulation schemes.

In some cases, the complexity of data aided phase tracking schemes is reduced by analyzing channel magnitudes. For example, N sub-blocks of subcarriers may be defined, and the subcarrier with the highest channel magnitude per sub-block, such as using channel estimation results, may be identified. By using a reduced number of data pilots, complexity of data aided phase tracking may be reduced.

When using data aided phase tracking, it is important to select reliable data pilots. Selecting data pilots according to the channel magnitude may provide the best choice when the channel is noise free, however, data aided phase tracking is supported for phase tracking under very low SNR regimes. Advanced data pilot selection schemes may take into account the amount of individual noise distortion of each subcarrier. For example, heavily distorted, complex data-pilot symbols may be identified by their distance to the mean symbol position. In some examples, all symbols within a defined sector are used, thereby taking into account their phase error in relation to the mean symbol position. To reduce complexity, channel magnitude analysis may be combined with a sector selection scheme. In some cases, the pre-selection using channel magnitude is valid for the whole data packet, whereas the sector selection scheme is an additional adaptive selection based at least in part on individual symbol conditions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined.

While the techniques of the present disclosure are described principally in the context of WLAN systems, these techniques may also be applied to other wireless (e.g., cellular, digital TV, digital radio, satellite, etc.) and wired systems (wireline, WAN, Ethernet, cable TV, etc.) communications systems. Also, although some aspects of the present disclosure are described with reference to OFDM symbols, the features described may also apply to other types of communication (e.g., time division multiplexing (TDM), code division multiplexing (CDM), and frequency division multiplexing (FDM)).

FIG. 1 illustrates a WLAN 100 configured in accordance with various aspects of the present disclosure. The WLAN 100 may include an access point (AP) 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network may communicate with one another through the AP 105. Also shown is a coverage area 110 of the AP 105, which may represent a basic service area (BSA) of the WLAN 100. Although FIG. 1 illustrates an example of a WLAN, the methods and systems described herein may also be utilized within other communications systems such as those based on an Institute of Electrical and Electronics Engineers (IEEE) 802.3 and 1905.1 standard.

Although not shown in FIG. 1, a STA 115 may be located at the intersection of more than one coverage area 110 and may associate with more than one AP 105. A single AP 105 and an associated set of STAs 115 may be referred to as a BSS. An ESS is a set of connected BSSs. A distribution system (DS) (not shown) may be used to connect APs 105 in an ESS. In some cases, the coverage area 110 of an AP 105 may be divided into sectors (also not shown). The WLAN network 100 may include APs 105 of different types (e.g., metropolitan area, home network, etc.), with varying and overlapping coverage areas 110. Two STAs 115 may also communicate directly via a direct wireless link 120 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

Devices such as STAs 115 and APs 105 may communicate by modulating a digital signal and transmitting the resulting wave form according to a multiplexing scheme such as orthogonal frequency division multiplexing (OFDM). Modulation is the process of representing a digital signal by modifying the properties of a periodic waveform (e.g., frequency, amplitude and phase). Demodulation takes a modified waveform and generates a digital signal. A modulated waveform is divided into time units known as symbols. Each symbol is modulated separately. In a wireless communication system that uses narrow frequency subcarriers to transmit distinct symbols, the modulation is accomplished by varying the phase and amplitude of each symbol. For example, a BPSK modulation scheme conveys information by alternating between waveforms that are transmitted with no phase offset or with a 180° offset (i.e., each symbol conveys a single bit of information). In a QAM scheme, two carrier signals (known as the in-phase component, I, and the quadrature component, Q) is transmitted with a phase offset of 90°, and each signal is transmitted with specific amplitude selected from a finite set. The number of amplitude bins determines the number of bits that are conveyed by each symbol. For example, in a 16 QAM scheme, each carrier signal may have one of four amplitudes (e.g., −3, −1, 1, 3), which results in 16 possible combinations (i.e., 4 bits). The various possible combinations may be represented in a graph known as a constellation map, where the amplitude of the I component is represented on the horizontal axis and the Q component is represented on the vertical axis.

In order to demodulate a wireless signal, a device may first determine properties of the signal such as a central frequency, a phase, and a normalized amplitude. This is accomplished using predetermined bits known as pilot symbols. Separate pilot symbols may be transmitted periodically to enable the generation of channel statistics, and data pilots may also be embedded in data transmissions. Devices such as STAs 115 and APs 105 may demodulate a set of OFDM data-pilot symbols and select a subset of based at least in part on the position of each data pilot on a constellation map (e.g., how close the data pilot symbol is to an actual constellation point). The device may then perform a data-pilot-based phase estimation based at least in part on the selected subset. The device may also reduce the number of data pilots by partitioning a set of subcarriers into groups and selecting a representative subcarrier from each group. The phase estimation is based at least in part on the data pilots received on the selected subcarriers. In some cases, the device may also generate a smooth phase signal based at least in part on a linear regression algorithm including a phase averaging and a phase offset estimation and perform the phase estimation using the smooth phase signal.

Figure 2:
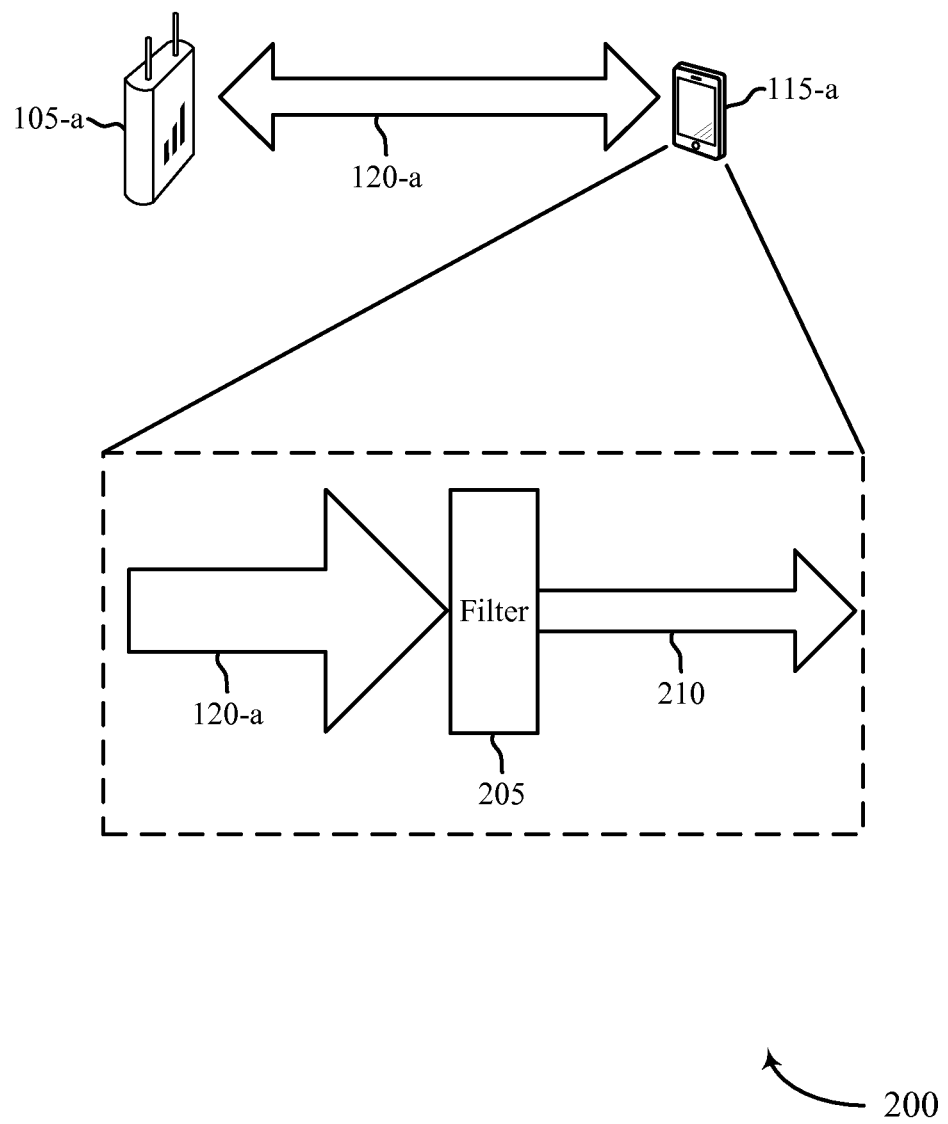
FIG. 2 illustrates an example of a wireless communications subsystem that supports feed-forward phase tracking in accordance with various aspects of the present disclosure.

FIG. 2 illustrates an example of a wireless communications subsystem 200 for feed-forward phase tracking in accordance with various aspects of the present disclosure. Communications subsystem 200 may include a STA 115-*a*, which is an example of a STA 115 described above with reference to FIG. 1. Communications subsystem 200 may also include a AP 105-*a*, which is an example of a AP 105 described above with reference to FIG. 1. Although the filtering of FIG. 2 is depicted at STA 115-*a*, filtering of pilot symbols and the associated phase estimations described in the present disclosure may be implemented within any device (including AP 105-*a*).

The AP 105-*a* may communicate with STA 115-*a* using communication link 120-*a*, which may cover a number of subcarriers. Communications from the AP 105-*a* to STA 115-*a* may include a number of pilot symbols, each of which is transmitted on a specific subcarrier. The pilot symbols may be used to synchronize communications between the AP 105-*a* and STA 115-*a*, such as for frequency and phase estimation/synchronization. The pilot symbols is filtered, such as using symbol filter 205, into a subset of pilot symbols 210. The device may also generate a smooth phase signal based at least in part on a linear regression algorithm including a phase averaging and a phase offset estimation and perform the phase estimation using the smooth phase signal.

Filtering the pilot symbols into the subset of pilot symbols 210 may include partitioning subcarriers. Within each sub-block a number of subcarriers (e.g., a single subcarrier), may be selected for use in phase estimation. The pilot symbols of the selected subcarriers used for phase estimation may be chosen using a number of factors, such as the channel transfer function (i.e., the strength of the signal received on each subcarrier). For example, the pilot symbol with the greatest signal magnitude in the sub-block is filtered into the subset of pilot symbols 210 and therefore chosen for phase estimation. This reduces the complexity and resources needed for phase estimation using pilot symbols, without greatly reducing the accuracy of the analysis since reliable pilot symbols may be used.

Additionally or alternatively, filtering the pilot symbols into the subset of pilot symbols 210 may include mapping the pilot symbols to a constellation map. For example, a symbol map is visualized as a plane with the in-phase (I) axis and quadrature (Q) axis coefficients of the waveform. Using the location of the symbol in the constellation, it can be determined whether the symbol lies near a constellation point, which represents a data value or a collection of bits. In some cases, the subset of pilot symbols 210 are used for phase estimation to reduce complexity and resources needed. The subset of pilot symbols 210 may be based at least in part on their location within the complex plane. Pilot symbols may be filtered into the subset of pilot symbols 210 if they fall within a threshold distance of a known constellation point. Pilot symbols may also be filtered into the subset of pilot symbols 210 if they fall within a specific region of the constellation map. For example, a region of the constellation map may include pilot symbols within a threshold phase offset of an axis. Similarly, functions, such as linear functions, may be used to define regions within which pilot symbols are to be included in the subset of pilot symbols 210. At times, the pilot symbols not included in the subset of pilot symbols 210 is discarded or ignored for purposes of phase estimation. As such, the number of pilot symbols for phase estimation is reduced which may reduce the complexity and resources needed to analyze pilot symbols, while reliable pilot symbols are prioritized for phase estimation.

In some cases, a filter scheme based at least in part on linear regression is used. For example, a three tap linear regression type tracking filter may allow for sufficient dynamic characteristics and low implementation complexities, while improving all modulation and coding schemes. A linear regression filter is based at least in part on both phase averaging and phase prediction and may reduce residual phase error.

Phase estimation may include processing a received symbol and identifying a phase error of the symbol. For example, a phase error is represented as a shift or rotation in a constellation map. Phase estimates from received symbols may be used to produce better estimates for subsequently processed symbols. In some cases, phase estimation may be based on periodically transmitted (and predetermined) pilot symbols. In other cases, phase estimation is based on predetermined pilot symbols embedded in data transmissions, or on control or data transmissions themselves.

Figure 3A:
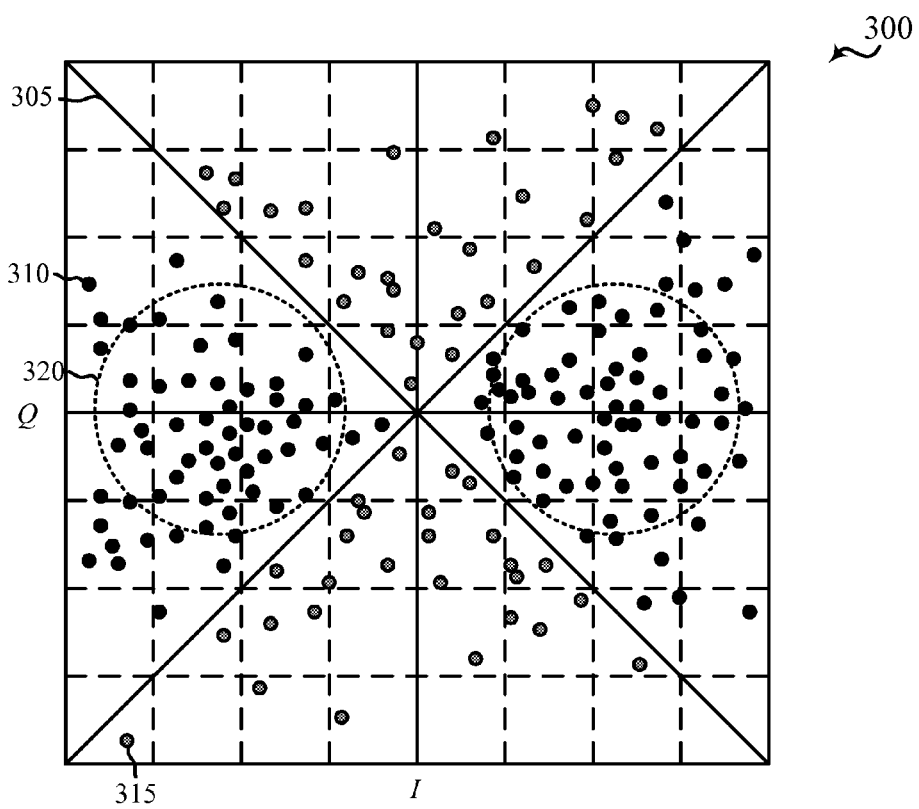
FIGS. 3A, 3B, and 3C illustrate examples of constellation maps representing received symbols in a device supporting feed-forward phase tracking in accordance with various aspects of the present disclosure.
Figure 3B:
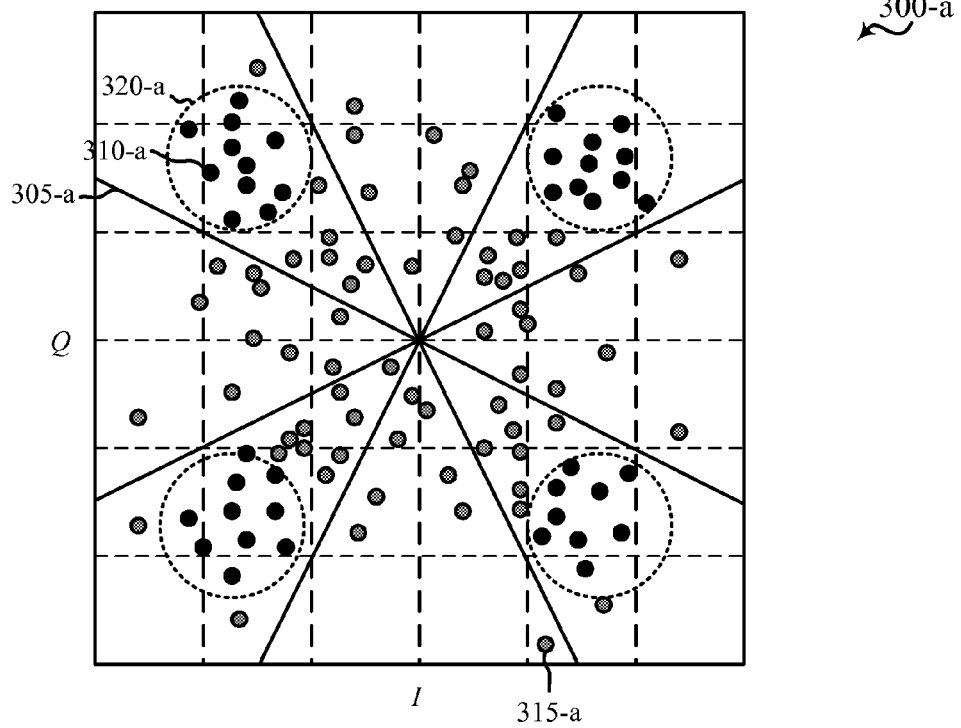
Figure 3C:
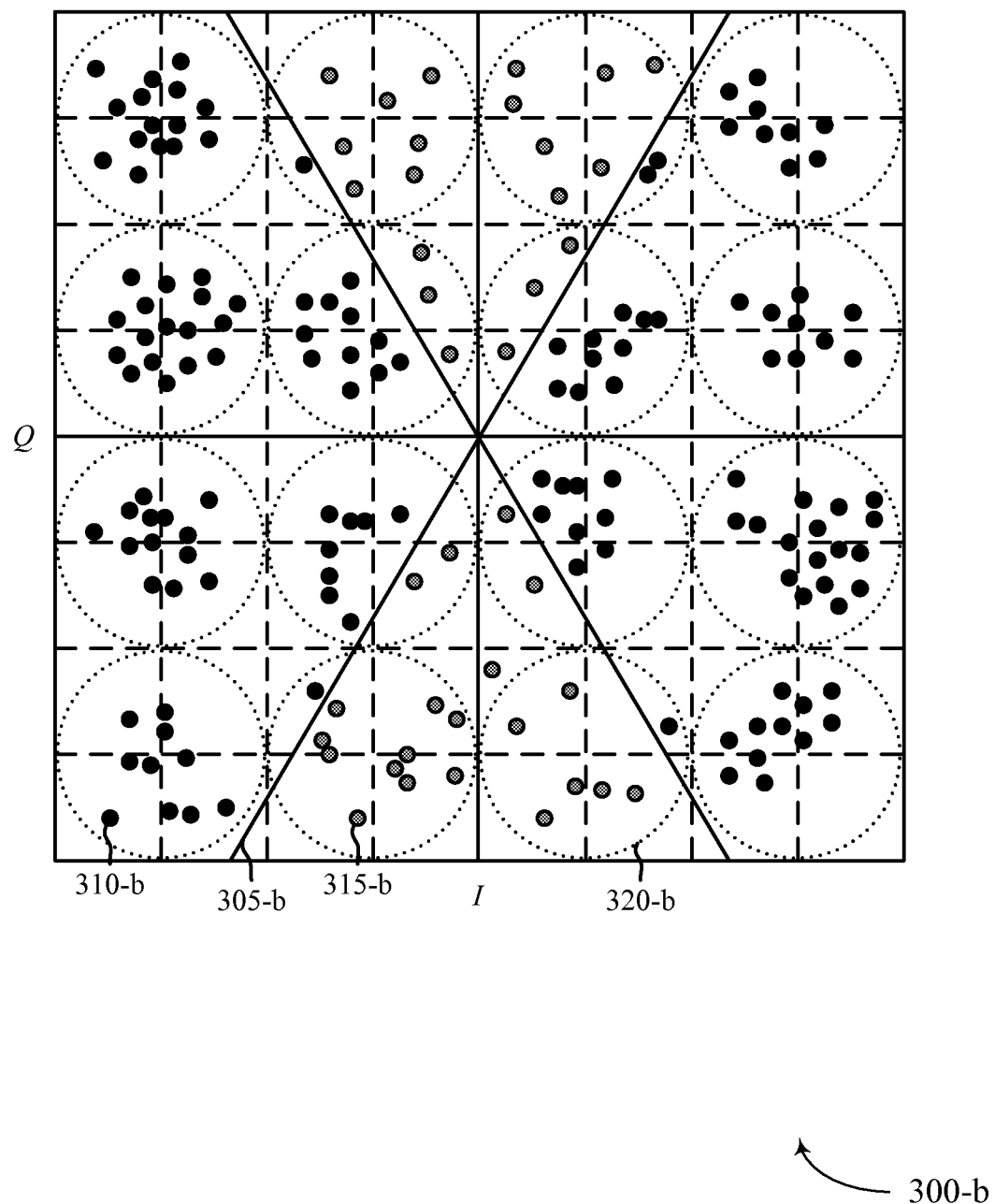

FIGS. 3A, 3B, and 3C illustrate examples of constellation maps 300, 300-*a*, and 300-*b* representing OFDM symbols detected by a receiving device that supports feed-forward phase tracking in accordance with various aspects of the present disclosure. Constellation maps 300, 300-*a*, and 300-*b* are I/Q plane representations of received symbols transmitted between an AP 105 and a STA 115, such as described in FIG. 1 or 2. In other examples, the symbols may be transmitted between two APs 105 or two STAs 115.

FIG. 3A illustrates a constellation mapping 300 according to various embodiments. In some cases, the constellation map 300 may represent a constellation map for use with a BPSK scheme. The constellation map includes a number of pilot symbols 310 and 315, such as pilot symbols received from an AP 105. The constellation map 300 further includes axis phase offset lines 305 which may define different regions of the constellation map 300. For example, when using a binary phase-shift keying (BPSK) scheme, there are two different constellation points, and regions may be defined to include a number of reliable pilot symbols 310 which are close to the expected constellation points and exclude a number of unreliable pilot symbols 315 which are far from the expected constellations points and may therefore be unreliable. For example, the axis phase offset lines 305, may consider pilot symbols within ±45° of the in-phase axis as being reliable pilot symbols 310. By defining the axis phase offset lines 305, it is possible to decode fewer, but more accurate pilot symbols 310 and thereby reduce the complexity of and resources needed for pilot symbol decoding. In some cases, the pilot symbols which are not considered reliable pilot symbols 310, or unreliable pilot symbols 315, are ignored or discarded.

At times, a threshold distance from expected constellation points may be used instead of or in addition to the axis phase offset lines 305. For example, when using a BPSK scheme, there may be two different expected constellation points. The threshold distance region 320 is defined as a region within a threshold distance from the expected constellation points of the demodulation scheme. Reliable pilot symbols 310 may be pilot symbols which fall within the region defined by the axis phase offset lines 305 or the threshold distance region 320 (i.e., within a circle of a given axis). As illustrated, the threshold distance region 320 includes a subset of the pilot symbols considered reliable pilot symbols 310 by the axis phase offset lines 305. Therefore, when using the threshold distance region 320, a number of the pilot symbols illustrated as reliable pilot symbols 310 based at least in part on the axis phase offset lines 305 may be considered unreliable pilot symbols 315 if they lie outside of the threshold distance region 320.

FIG. 3B illustrates a constellation mapping 300-*a* according to various embodiments. In some cases, the constellation map 300-*a* may represent a constellation map for use with a QPSK scheme. When using a quadrature phase-shift keying (QPSK) scheme, there are four different constellation points. Axis phase offset lines 305-*a* may be defined to incorporate regions close to the expected constellation points, and exclude regions which are not close to the expected constellation points. For example, the axis phase offset lines 305-*a* may consider pilot symbols between ±20° and ±70° from an axis as reliable pilot symbols 310-*a*. The pilot symbols which are not within the axis phase offset lines 305-*a* may be considered unreliable pilot symbols 315-*a* and may be ignored or discarded. As illustrated, threshold distance regions 320-*a* may be used to determine whether pilot symbols are reliable pilot symbols 310-*a* or unreliable pilot symbols 315-*a*. If a pilot symbol falls within one of the threshold distance regions 320-*a* it is considered a reliable pilot symbol 310-*a*. Similarly if a pilot symbol is not within one of the threshold distance regions 320-*a*, it is considered an unreliable pilot symbol 315-*a* and is ignored or discarded. In some cases, there are as many threshold distance regions 320-*a* as there are expected constellation points based at least in part on the modulation and coding scheme.

FIG. 3C illustrates a constellation mapping 300-*b* according to various embodiments. In some cases, the constellation map 300-*b* may represent a constellation map for use with a 16 quadrature amplitude modulation (QAM) scheme. A 16QAM scheme may have 16 different expected constellation points. Axis phase offset lines 305-*b* may be defined to prevent wrong decisions due to CFO based rotation. For example, the axis phase offset lines 305-*b* may consider pilot symbols within ±60° from the in-phase axis as being reliable pilot symbols 310-*b*. The pilot symbols which are not within the axis phase offset lines 305-*b* may be considered unreliable pilot symbols 315-*b* and may be ignored or discarded. Threshold distance regions 320-*b* may be used to determine whether pilot symbols are reliable pilot symbols 310-*b* or unreliable pilot symbols 315-*b*. Pilot symbols may be considered reliable pilot symbols 310-*b* if all or some of the pilot symbol falls within an acceptable region, such as a region as defined by the axis phase offset lines 305-*b* or the threshold distance regions 320-*b*.

Figure 4:
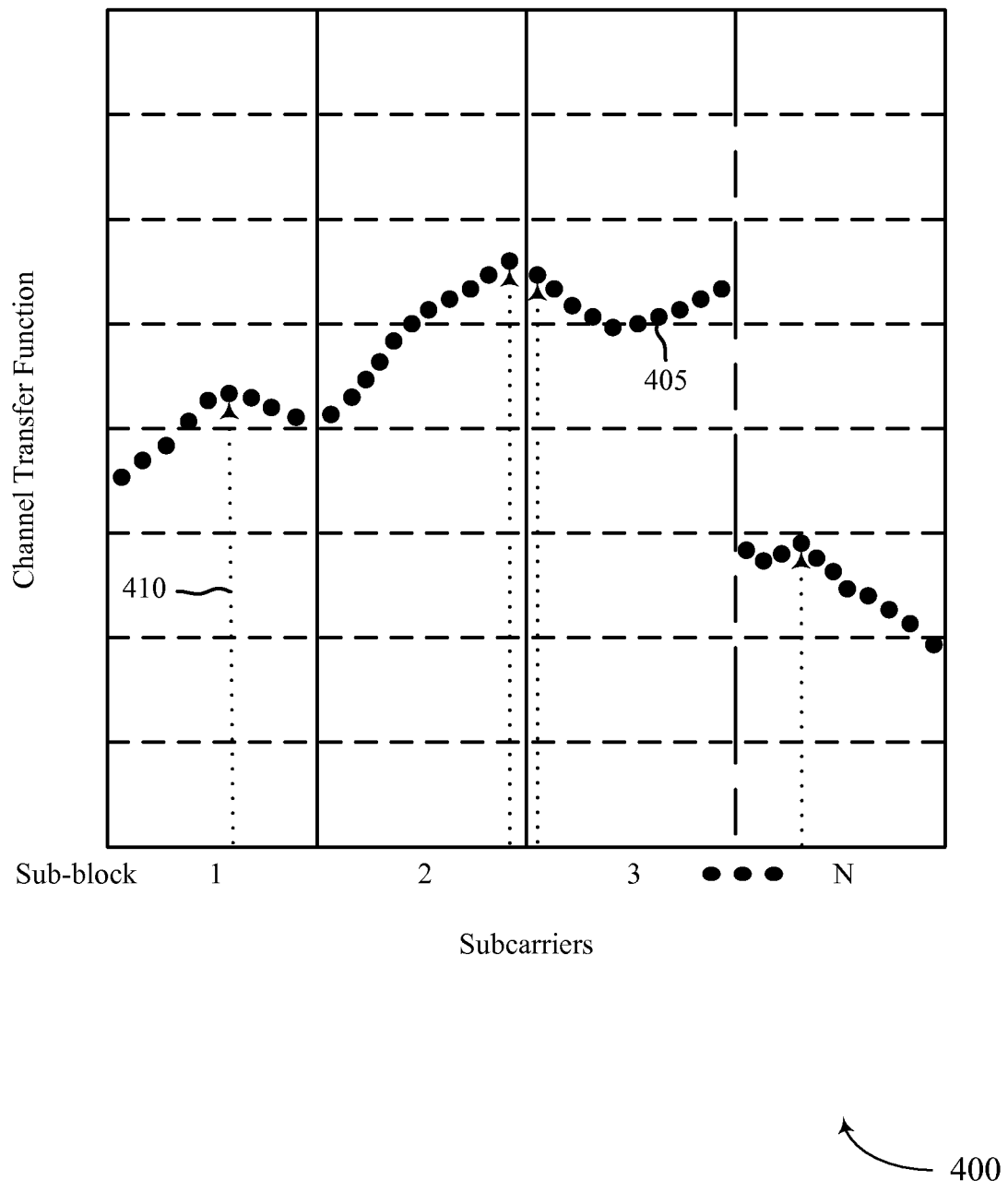
FIG. 4 illustrates an example graph of partitioned subcarriers in a device supporting feed-forward phase tracking in accordance with various aspects of the present disclosure.

FIG. 4 illustrates an example graph 400 of partitioned subcarriers in a device supporting feed-forward phase tracking in accordance with various aspects of the present disclosure. The graph 400 is a graphical representation of subcarriers transmitted between an AP 105 and a STA 115, such as described in FIG. 1 or 2. In other examples, the symbols may be transmitted between two APs 105 or two STAs 115.

Graph 400 showing subcarriers 405 graphed according to their channel transfer function. A STA 115 may receive a number of subcarriers 405, such as those used for communication with an AP 105. The subcarriers 405 may be partitioned into N sub-blocks, such as pseudo-randomly or based at least in part on subcarrier index, component carrier, or other factors. In some cases, each sub-block contains a similar number of subcarriers 405, or different sub-blocks may contain different numbers of subcarriers 405.

Once subcarriers 405 are separated into sub-blocks, a number of subcarriers 405 may be chosen for analysis, such as phase estimation, demodulation, or decoding. For example, a selected subcarrier 410 may be chosen from each sub-block for phase estimation. In some cases, the selected subcarriers 410 are chosen because they include a strong signal (i.e., strong pilot symbols) and have the greatest channel magnitude for the sub-block to which they belong. It should be noted that various selection criterion may be used for choosing selected subcarriers 410, such as based at least in part on amplitude, time, phase, frequency, etc. Additionally, multiple selection criteria may be used for choosing selected subcarriers 410. By selecting a subset of the subcarriers 405 for phase estimation, complexity is lowered and the resources needed for pilot symbol phase estimation is reduced. Further, by adjusting the selection criteria, reliable pilot symbols, such as the selected subcarriers 410, may be chosen for phase estimation, which reduces inaccuracies associated with using a subset of the available subcarriers 405.

Figure 5:
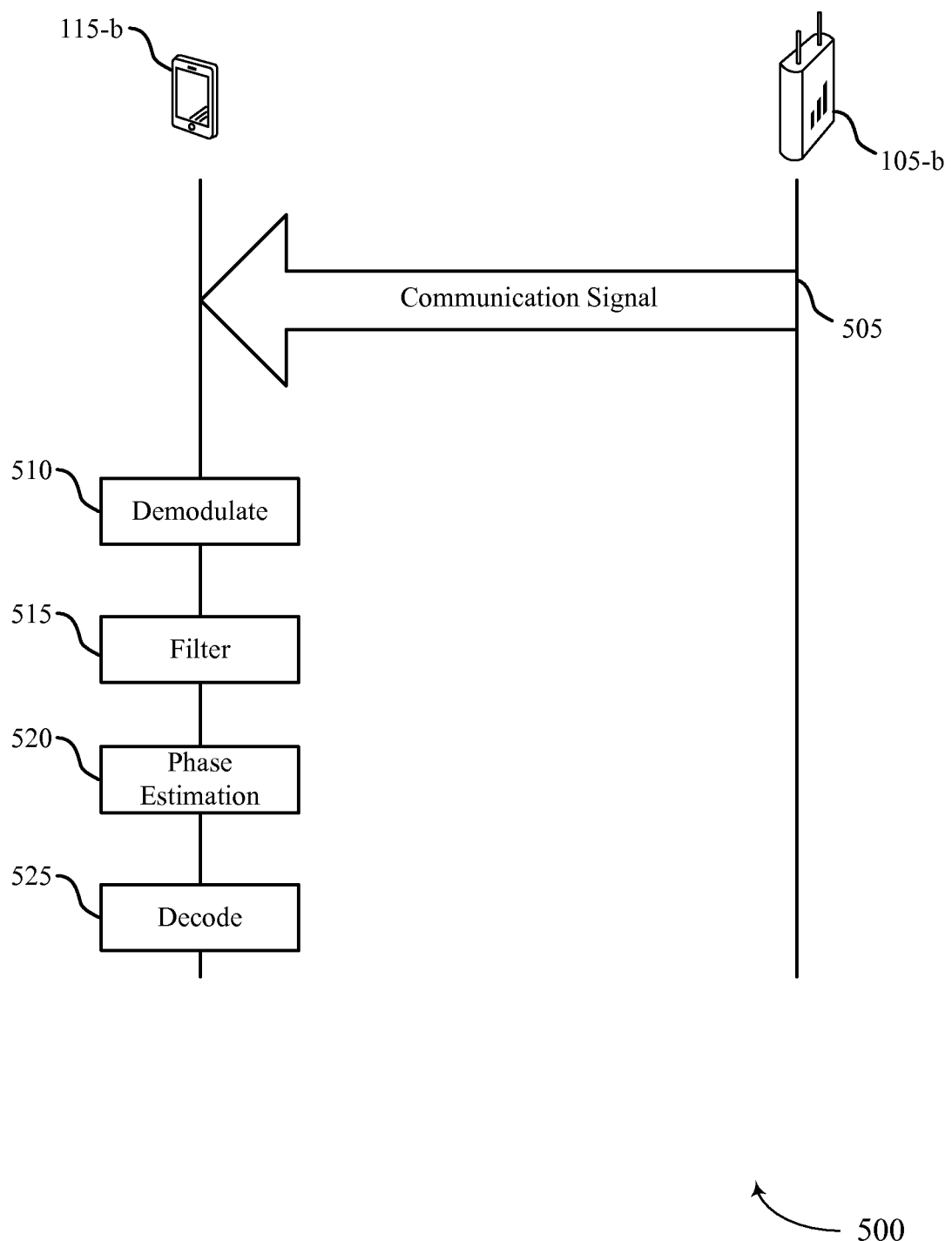
FIG. 5 illustrates an example of a process flow that supports feed-forward phase tracking in accordance with various aspects of the present disclosure.

FIG. 5 illustrates an example of a process flow 500 for feed-forward phase tracking in accordance with various aspects of the present disclosure. Process flow 500 may include a STA 115-*b*, which is an example of a STA 115 described above with reference to FIGS. 1-2. Process flow 500 may also include an AP 105-*b*, which is an example of an AP 105 described above with reference to FIGS. 1-2. In some cases, the steps described in FIG. 5 may be accomplished by a device other than a STA 115 (e.g., an AP 105 or another device).

At block 505, an AP 105-*b* may transmit a wireless communication signal to STA 115-*b*. The communication signal may include a number of different component carriers or subcarriers, each of which may include a number of pilot symbols.

At block 510, STA 115-*b* may demodulate the communication signal from the AP 105-*b*. STA 115-*b* may demodulate a set of OFDM data-pilot symbols. Demodulation may include performing a FFT and mapping pilot symbols to a constellation map. In some examples, demodulating a set of OFDM data-pilot symbols includes demodulating the set of OFDM data-pilot symbols using binary phase shift keying (BPSK), quadrature phase shift keying (QPSK), or quadrature amplitude modulation (QAM).

At block 515, STA 115-*b* may filter the pilot symbols. STA 115-*b* may select a subset of OFDM data-pilot symbols based at least in part on a position of each of the set of OFDM data-pilot symbols in a modulation constellation map. STA 115-*b* may calculate a distance from each of the set OFDM data-pilot symbols to a nearest constellation point in the modulation constellation map. In some examples, selecting the subset of OFDM symbols includes selecting the subset of OFDM symbols for which the distance to the nearest constellation point is less than a threshold. STA 115-*b* may identify a region of the constellation map, wherein each point in the region has a phase offset from at least one axis that is less than a threshold. In some examples, selecting the subset of OFDM symbols includes selecting the subset of OFDM symbols that fall with the region of the constellation map. For example, a region may be defined based at least in part on a phase offset from an axis of a constellation map or a threshold distance from an expected constellation point of a constellation map. In some examples, the axis includes an in-phase axis or an oblique axis.

Additionally or alternatively, pilot symbols may be grouped into sub-blocks and a number of pilot symbols from the sub-blocks may be selected. STA 115-*b* may perform a channel estimation for each subcarrier in a set of subcarriers. STA 115-*b* may partition the set of subcarriers into a plurality of groups of contiguous subcarriers. STA 115-*b* may select a representative subcarrier from each group based at least in part on the channel estimation corresponding to each subcarrier in the group. The pilot symbols which are not selected or within a defined region may be discarded or ignored.

At block 520, STA 115-*b* may analyze the pilot symbols and phase correct the communication signal based at least in part on the analysis. STA 115-*b* may perform a data-pilot-based phase estimation based at least in part on selecting the subset of OFDM data-pilot symbols. STA 115-*b* may analyze a subset of the received pilot symbols, such as based at least in part on the filtering of block 515. Analysis of the pilot symbols may include phase estimation and determining a phase offset of a pilot symbol.

At block 525, STA 115-*b* may decode the communication signal from the AP 105-*b*. Decoding the communication signal may include applying an inverse of the phase offset to symbols received as a part of the communication signal. In some cases, a different phase offset is used for decoding different potions of data in the communication signal. For example, each sub-block, subcarrier, or component carrier may have a different phase offset associated with it and the associated phase offset may be used for decoding subsequent symbols, such as data symbols, in the communication signal.

In some cases, STA 115-*b* may generate a smooth phase signal based at least in part on a linear regression algorithm comprising a phase averaging and a phase offset estimation. In some examples, performing a data-pilot-based phase estimation includes performing a data-pilot-based phase estimation based at least in part on the smooth phase signal.

Figure 6:
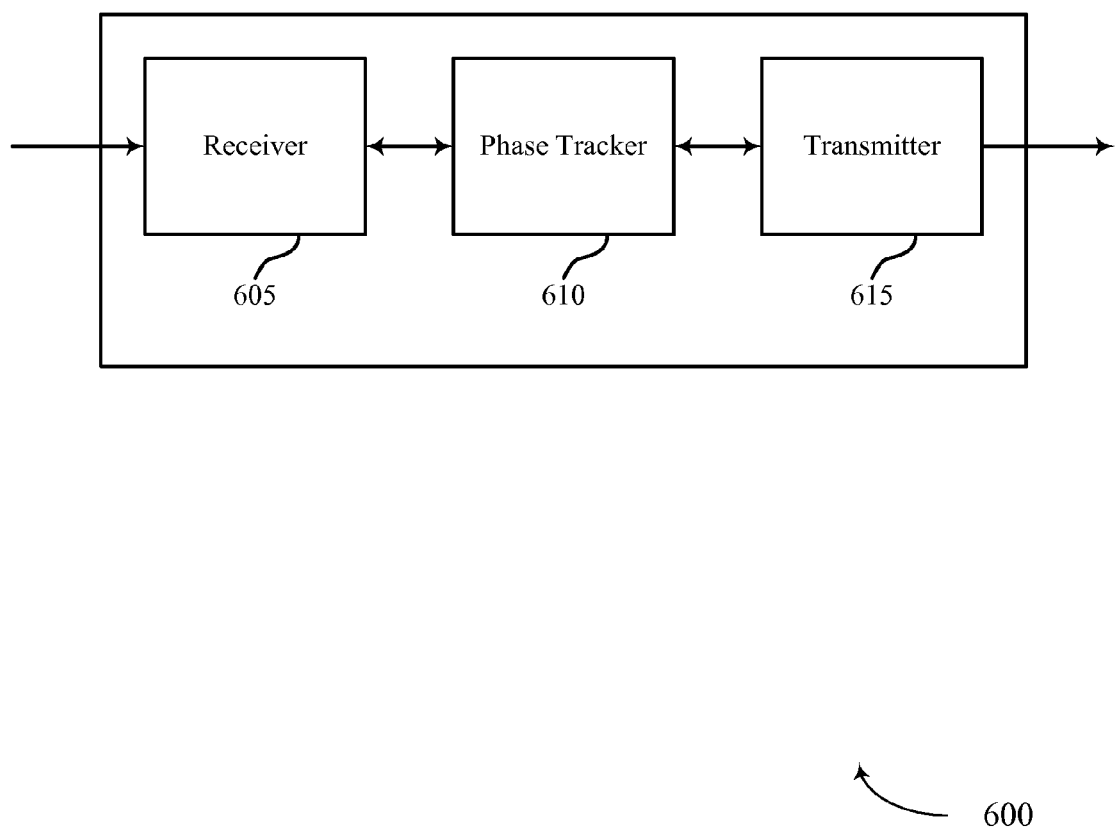
FIG. 6 shows a block diagram of a device that supports feed-forward phase tracking in accordance with various aspects of the present disclosure.

FIG. 6 shows a block diagram of a device 600 configured for feed-forward phase tracking in accordance with various aspects of the present disclosure. Device 600 is an example of aspects of a STA 115 or an AP 105 described with reference to FIGS. 1-5. Device 600 may include a receiver 605, a phase tracker 610, or a transmitter 615. Device 600 may also include a processor. Each of these components may be in communication with each other.

The receiver 605 may receive information such as packets, user data, or control information associated with various information channels (e.g., control channels, data channels, and information related to feed-forward phase tracking, etc.). Information is passed on to the phase tracker 610 and to other components of device 600.

The phase tracker 610 may demodulate a set of OFDM data-pilot symbols, select a subset of OFDM data-pilot symbols based at least in part on a position of each of the set of OFDM data-pilot symbols in a modulation constellation map, and perform a data-pilot-based phase estimation based at least in part on selecting the subset of OFDM data-pilot symbols.

The transmitter 615 may transmit signals received from other components of device 600. In some examples, the transmitter 615 is collocated with the receiver 605 in a transceiver. The transmitter 615 may include a single antenna, or it may include a plurality of antennas.

Figure 7:
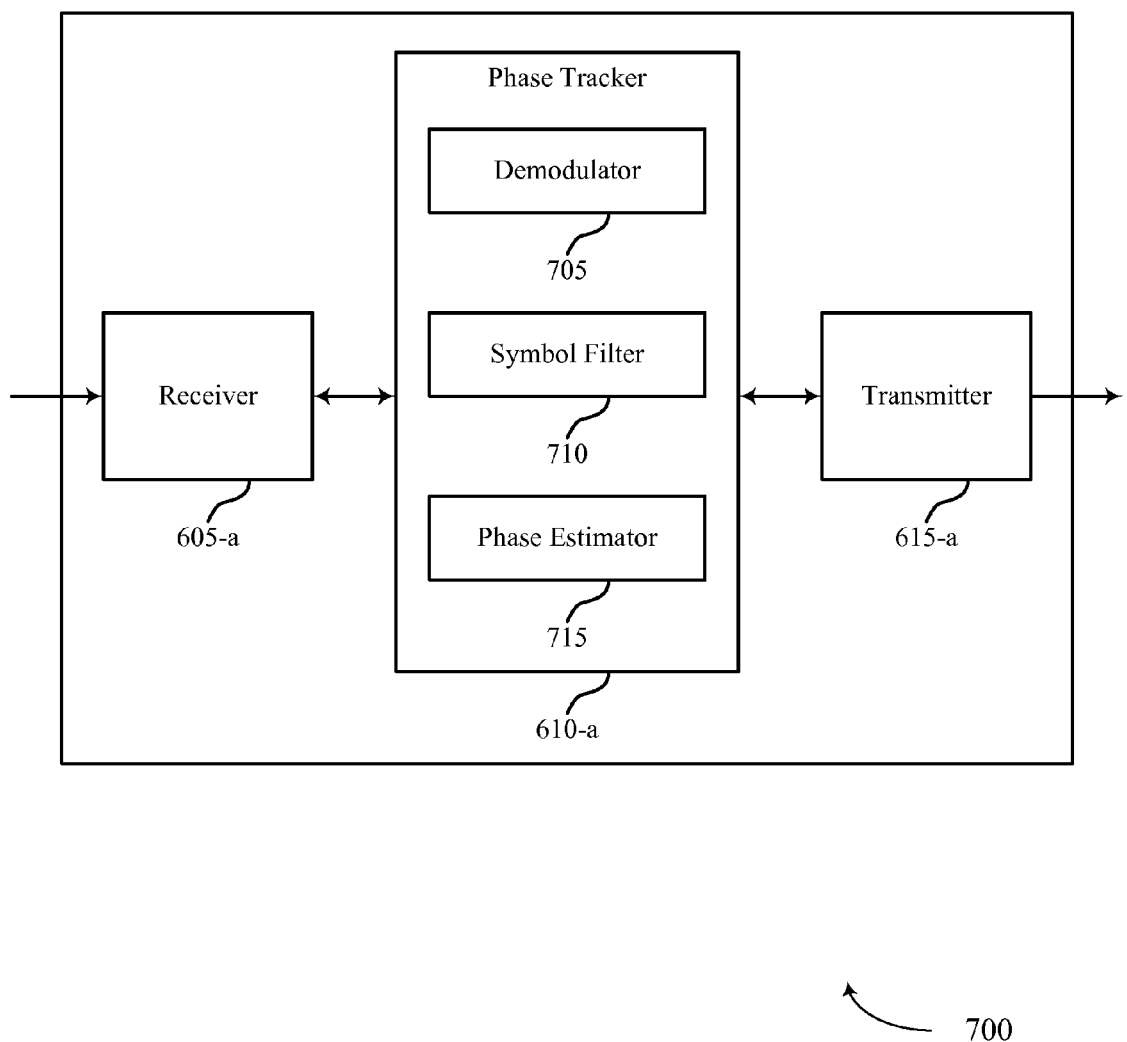
FIG. 7 shows a block diagram of a device that supports feed-forward phase tracking in accordance with various aspects of the present disclosure.

FIG. 7 shows a block diagram of a device 700 for feed-forward phase tracking in accordance with various aspects of the present disclosure. Device 700 is an example of aspects of a device 600 or a STA 115 or an AP 105 described with reference to FIGS. 1-6. Device 700 may include a receiver 605-*a*, a phase tracker 610-*a*, or a transmitter 615-*a*. Device 700 may also include a processor. Each of these components is in communication with each other. The phase tracker 610-*a* may also include a demodulator 705, a symbol filter 710, and a phase estimator 715.

The receiver 605-*a* may receive information which is passed on to phase tracker 610-*a*, and to other components of device 700. The phase tracker 610-*a* may perform the operations described above with reference to FIG. 6. The transmitter 615-*a* may transmit signals received from other components of device 700. The demodulator 705 may demodulate a set of OFDM data-pilot symbols as described above with reference to FIGS. 2-5. In some examples, demodulating a set of OFDM data-pilot symbols includes demodulating the set of OFDM data-pilot symbols using BPSK or QAM. In some examples, demodulating a set of OFDM data-pilot symbols includes demodulating the set of OFDM data-pilot symbols using QPSK.

The symbol filter 710 may select a subset of OFDM data-pilot symbols based at least in part on a position of each of the set of OFDM data-pilot symbols in a modulation constellation map as described above with reference to FIGS. 2-5. The symbol filter 710 may also calculate a distance from each of the set OFDM data-pilot symbols to a nearest constellation point in the modulation constellation map. In some examples, selecting the subset of OFDM symbols includes selecting the subset of OFDM symbols for which the distance to the nearest constellation point is less than a threshold. The symbol filter 710 may also identify a region of the constellation map, wherein each point in the region has a phase offset from at least one axis that is less than a threshold. In some examples, selecting the subset of OFDM symbols includes selecting the subset of OFDM symbols that fall with the region of the constellation map. In some examples, the at least one axis includes an in-phase axis. In some examples, the at least one axis includes an oblique axis.

The phase estimator 715 may perform a data-pilot-based phase estimation based at least in part on selecting the subset of OFDM data-pilot symbols as described above with reference to FIGS. 2-5. In some examples, performing a data-pilot-based phase estimation includes performing a data-pilot-based phase estimation based at least in part on the smooth phase signal.

Figure 8:
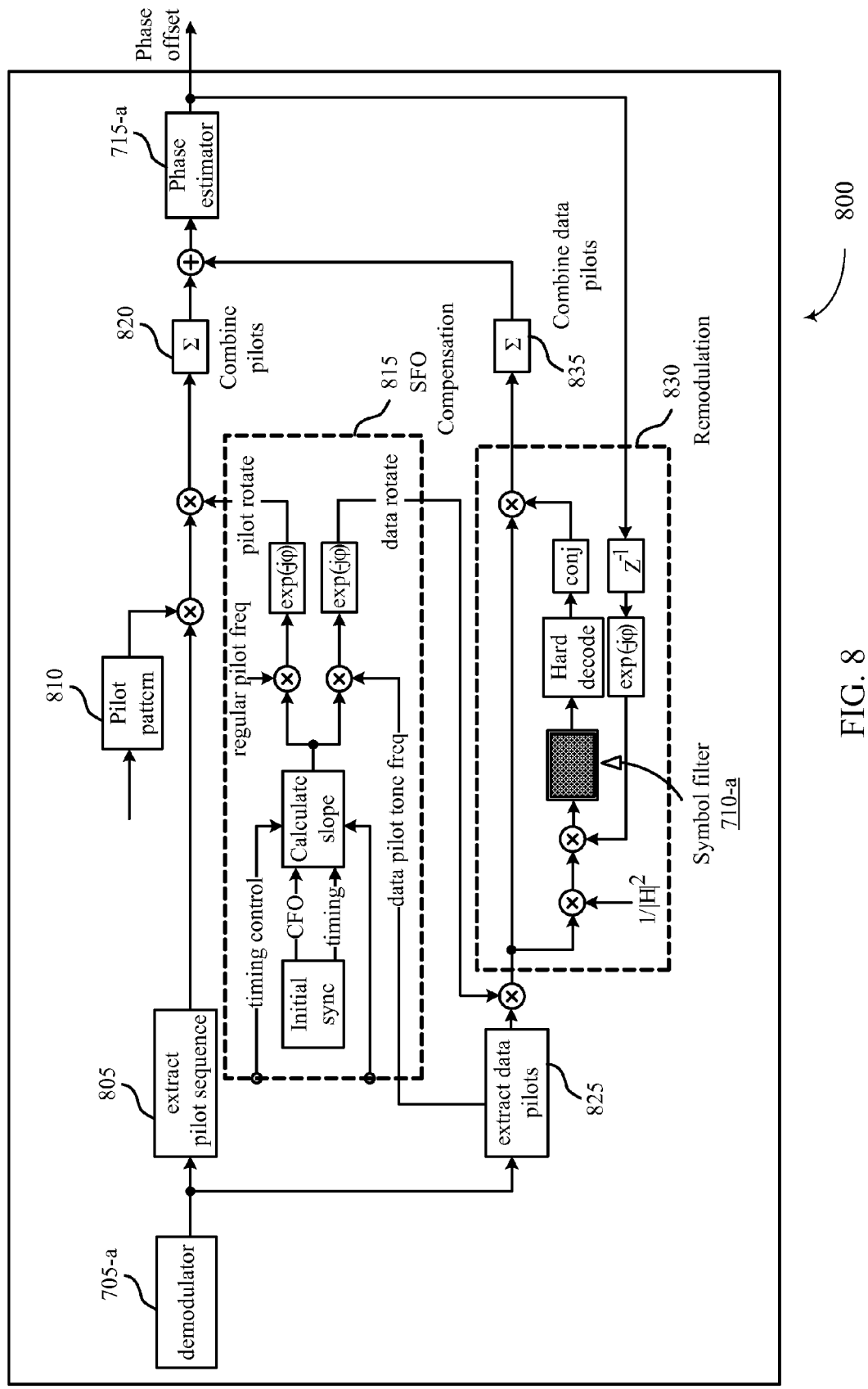
FIG. 8 shows a block diagram of a device that supports feed-forward phase tracking in accordance with various aspects of the present disclosure.

FIG. 8 shows an example of a phase tracker 800 which is a component of a device 600 or a device 700 for feed-forward phase tracking in accordance with various aspects of the present disclosure. The phase tracker 800 is an example of aspects of a phase tracker 610 described with reference to FIGS. 6-7. The phase tracker 800 may include a demodulator 705-*a*, a symbol filter 710-*a*, and a phase estimator 715-*a*. Each of these modules may perform the functions described above with reference to FIG. 7. The phase tracker 800 may also include a pilot sequence extractor 805, a pilot pattern input 810, a sampling frequency offset (SFO) compensator 815, a pilot combiner 820, a data pilot extractor 825, a remodulator 830, and a data pilot combiner 835.

The pilot sequence extractor 805 may take an input from demodulator 705-*a* (which may also represent multiple signal streams combined by a maximal ratio combiner (MRC), not shown) and extract a pilot sequence for phase tracking.

The pilot pattern input 810 may send a known pilot pattern sequence for combination with the pilot pattern extracted by pilot sequence extractor 805. The sampling frequency offset (SFO) compensator 815 may take input from data pilot extractor 825 to combine with the pilot pattern after SFO compensation. The pilot combiner 820 may combine one or more pilots (e.g., from different subcarriers). The data pilot extractor 825 may extract data pilots from a demodulated signal. The remodulator 830 may process and remodulate the data pilots using input from the data pilot extractor 825 and SFO compensator 815. In some cases, symbol filter 710-*a* is located prior to a hard decision decoder of remodulator 830. The data pilot combiner 835 may combine data pilots for phase tracking taking input from data pilot remodulator 830. In some cases (not shown), symbol filter 710-*a* is located prior to data pilot combiner 835, but after the processing of remodulator 830.

The components of device 600, device 700, or phase tracker 800 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which is programmed in any manner known in the art. The functions of each unit may also be implemented, in whole or in part, with instructions embodied in a memory, formatted to be executed by one or more general or application-specific processors.

Figure 9A:
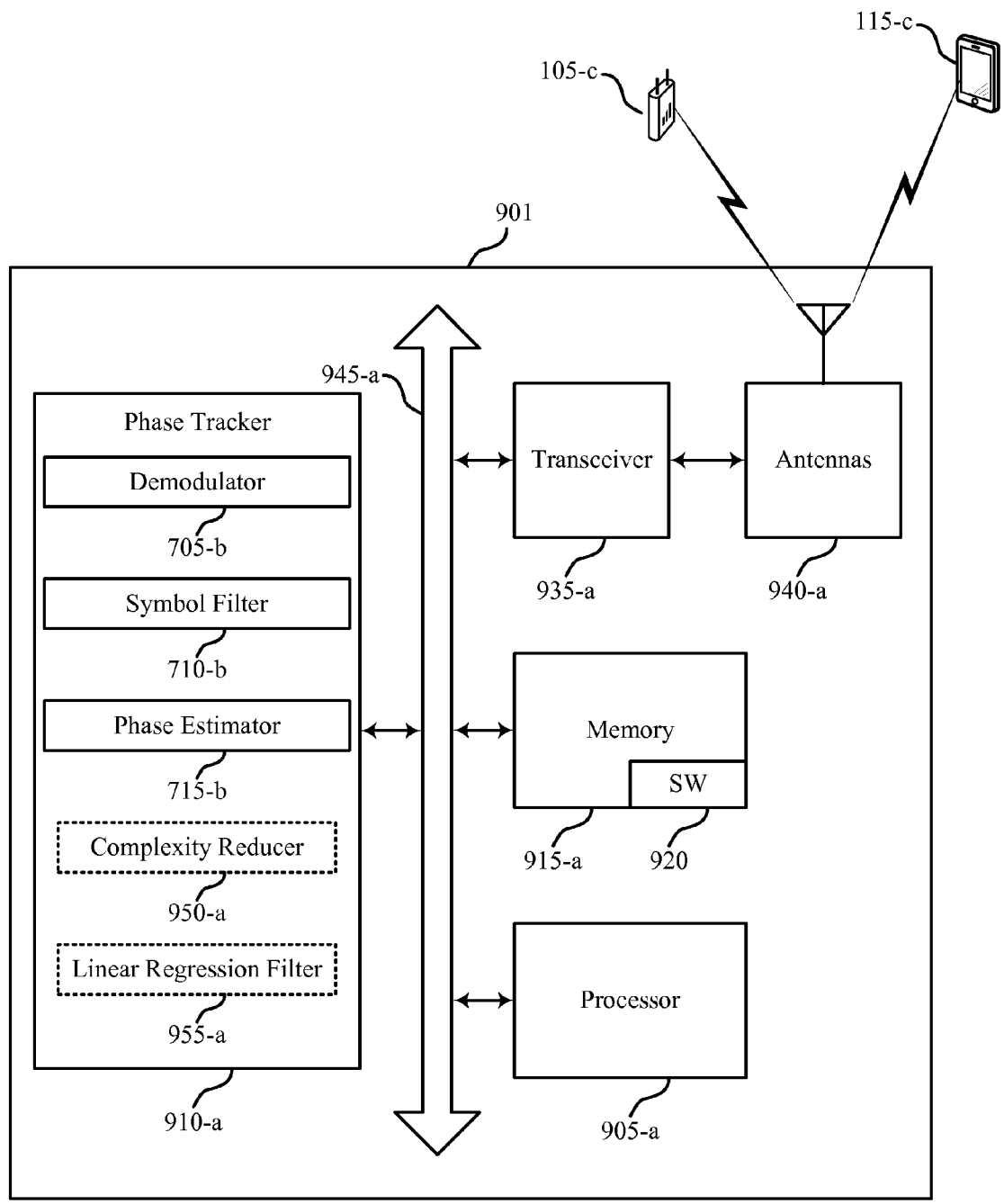
FIG. 9A illustrates a block diagram of a system including a device that supports feed-forward phase tracking in accordance with various aspects of the present disclosure.

FIG. 9A shows a diagram of a system 900-*a* including a device 901 configured for feed-forward phase tracking in accordance with various aspects of the present disclosure. System 900-*a* may include device 901, which is an example of a device 600, a device 700, or a STA 115 or an AP 105 described above with reference to FIGS. 1-8. Device 901 may include a phase tracker 910-*a*, which is an example of a phase tracker 610 described with reference to FIGS. 6-8. The phase tracker 910-*a* may also include a demodulator 705-*b*, a symbol filter 710-*b*, a phase estimator 715-*b*, a complexity reducer 950-*a*, and a linear regression filter 955-*a*. Device 901 may also include components for bi-directional voice and data wireless communications including components for transmitting communications and components for receiving communications. For example, device 901 may communicate bi-directionally with AP 105-*c* or STA 115-*c*.

The complexity reducer 950-*a* may perform a channel estimation for each subcarrier in a set of subcarriers as described above with reference to FIGS. 2-5. The complexity reducer 950-*a* may also partition the set of subcarriers into a plurality of groups of contiguous subcarriers. The complexity reducer 950-*a* may also select a representative subcarrier from each group based at least in part on the channel estimation corresponding to each subcarrier in the group.

The linear regression filter 955-*a* may generate a smooth phase signal based at least in part on a linear regression algorithm comprising a phase averaging and a phase offset estimation as described above with reference to FIGS. 2-5.

Device 901 may also include a processor 905-*a*, and memory 915-*a* (including software (SW)) 920, a transceiver 935-*a*, and one or more antenna(s) 940-*a*, each of which may communicate, directly or indirectly, with one another (e.g., via buses 945-*a*). The transceiver 935-*a* may communicate bi-directionally, via the antenna(s) 940-*a* or wired or wireless links, with one or more networks, as described above. For example, the transceiver 935-*a* may communicate bi-directionally with a AP 105 or another STA 115. The transceiver 935-*a* may include a modem to modulate the packets and provide the modulated packets to the antenna(s) 940-*a* for transmission, and to demodulate packets received from the antenna(s) 940-*a*. While device 901 may include a single antenna 940-*a*, device 901 may also have multiple antennas 940-*a* capable of concurrently transmitting or receiving multiple wireless transmissions.

The memory 915-*a* may also include random access memory (RAM) and read only memory (ROM). The memory 915-*a* may store computer-readable, computer-executable software/firmware code 920 including instructions that, when executed, cause the processor 905-*a* to perform various functions described herein (e.g., for feed-forward phase tracking, etc.). Alternatively, the computer-executable software/firmware code 920 may not be directly executable by the processor 905-*a* but cause a computer (e.g., when compiled and executed) to perform functions described herein. The processor 905-*a* may include an intelligent hardware device, (e.g., a central processing unit (CPU), a microcontroller, an ASIC, etc.)

Figure 9B:
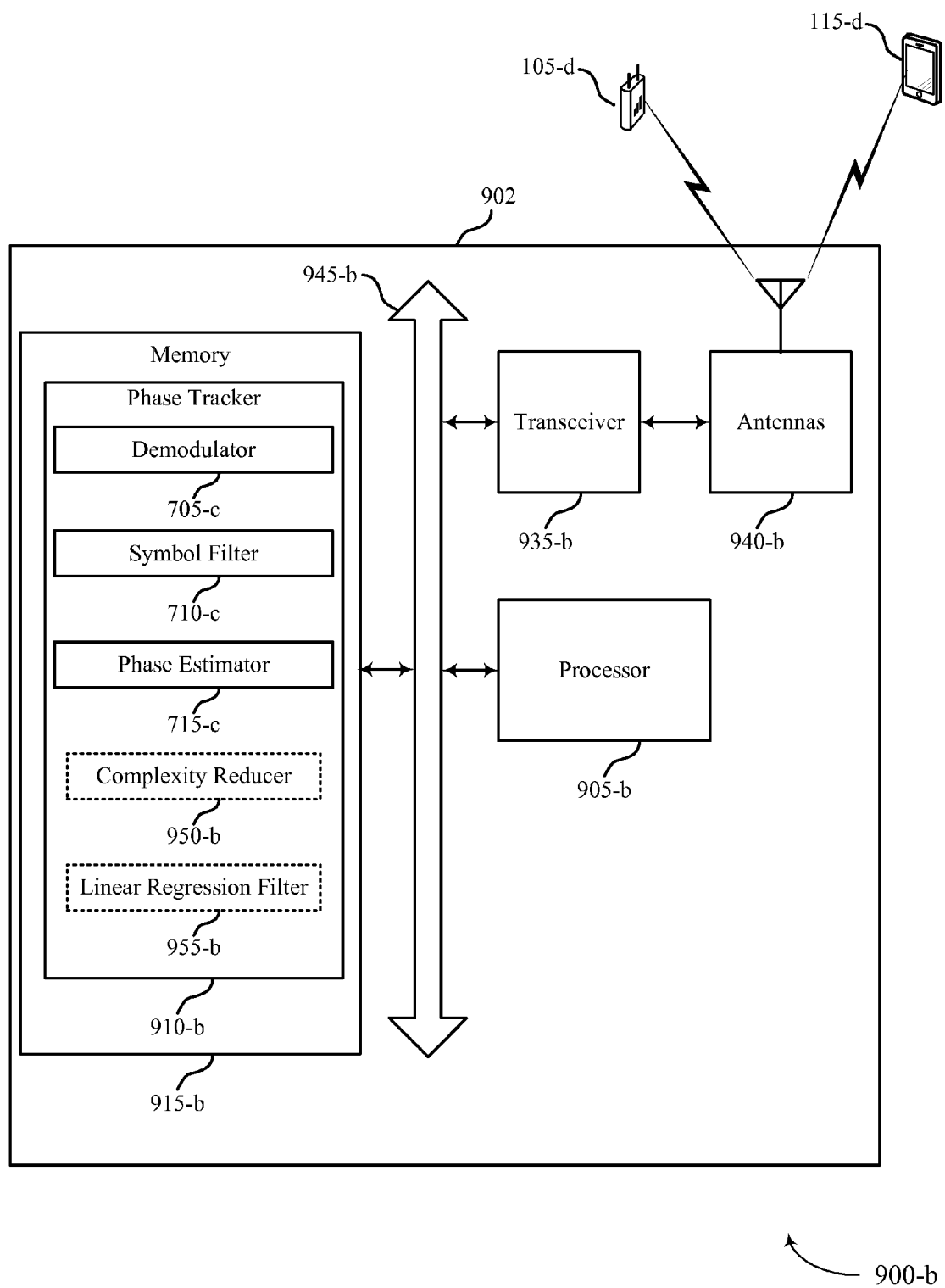
FIG. 9B illustrates a block diagram of a system including a device that supports feed-forward phase tracking in accordance with various aspects of the present disclosure.

FIG. 9B shows a diagram of a system 900-*b* including a device 902 configured for feed-forward phase tracking in accordance with various aspects of the present disclosure. System 900-*b* may include a device 902, which is an example of a device 600, a device 700, or a STA 115 or an AP 105 described above with reference to FIGS. 1-8. Device 902 may include a phase tracker 910-*b*, which is an example of a phase tracker 610 described with reference to FIGS. 6-8. A memory 915-*b* of the phase tracker 910-*b* may also include modules to perform the functions of a demodulator 705-*c*, a symbol filter 710-*c*, a phase estimator 715-*c*, a complexity reducer 950-*b*, and a linear regression filter 955-*b*. Device 902 may also include components for bi-directional voice and data communications including components for transmitting communications and components for receiving communications. For example, device 902 may communicate bi-directionally with AP 105-*d* or STA 115-*d*.

Device 902 may also include a processor 905-*b*, and memory 915-*b*, a transceiver 935-*b*, and one or more antenna(s) 940-*b*, each of which may communicate, directly or indirectly, with one another (e.g., via buses 945-*b*). The transceiver 935-*b* may communicate bi-directionally, via the antenna(s) 940-*b* or wired or wireless links, with one or more networks, as described above. For example, the transceiver 935-*b* may communicate bi-directionally with a AP 105 or another STA 115. The transceiver 935-*b* may include a modem to modulate the packets and provide the modulated packets to the antenna(s) 940-*b* for transmission, and to demodulate packets received from the antenna(s) 940. While device 902 may include a single antenna 940-*b*, device 902 may also have multiple antennas 940-*b* capable of concurrently transmitting or receiving multiple wireless transmissions.

The memory 915-*b* may include random access memory (RAM) and read only memory (ROM). The memory 915-*b* may store computer-readable, computer-executable software/firmware code including instructions that, when executed, cause the processor 905-*b* to perform various functions described herein (e.g., feed-forward phase tracking, etc.). For example, the memory 915-*b* may include software modules to perform the functions of a demodulator 705-*c*, a symbol filter 710-*c*, a phase estimator 715-*c*, a complexity reducer 950-*b*, and a linear regression filter 955-*b* as described above.

Figure 10:
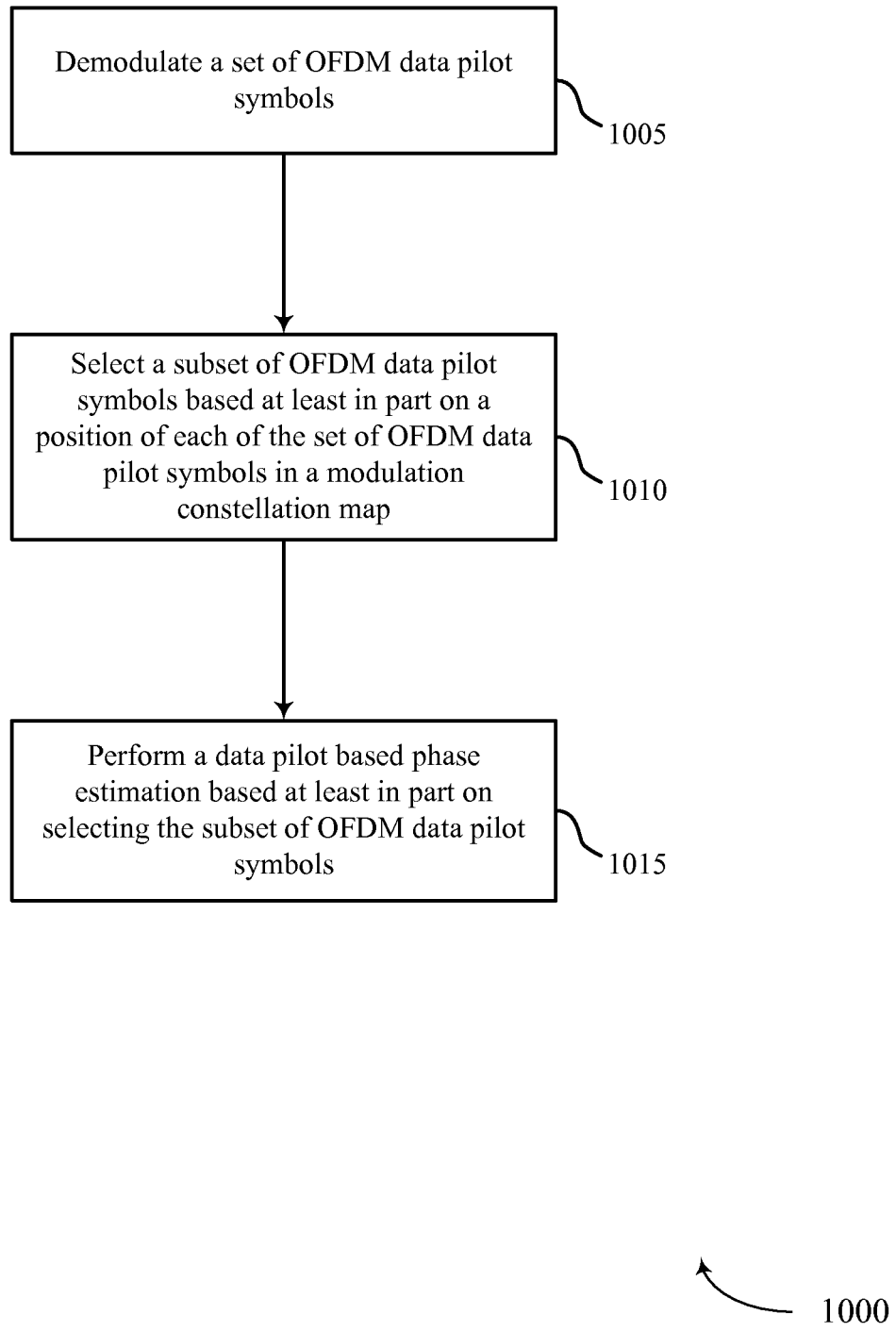
FIG. 10 illustrates a method for feed-forward phase tracking in accordance with various aspects of the present disclosure.

FIG. 10 shows a flowchart illustrating a method 1000 for feed-forward phase tracking in accordance with various aspects of the present disclosure. The operations of method 1000 is implemented by a device such as a STA 115 or an AP 105 or its components as described with reference to FIGS. 1-9. For example, the operations of method 1000 is performed by the phase tracker 610 as described with reference to FIGS. 6-9. In some examples, a device may execute a set of codes to control the functional elements of the device to perform the functions described below. Additionally or alternatively, the device may perform aspects of the functions described below using special-purpose hardware.

At block 1005, the device may demodulate a set of OFDM data-pilot symbols as described above with reference to FIGS. 2-5. In certain examples, the operations of block 1005 is performed by the demodulator 705 as described above with reference to FIG. 7. At block 1010, the device may select a subset of OFDM data-pilot symbols based at least in part on a position of each of the set of OFDM data-pilot symbols in a modulation constellation map as described above with reference to FIGS. 2-5. In certain examples, the operations of block 1010 is performed by the symbol filter 710 as described above with reference to FIG. 7.

At block 1015, the device may perform a data-pilot-based phase estimation based at least in part on selecting the subset of OFDM data-pilot symbols as described above with reference to FIGS. 2-5.

Phase estimation may include processing a received symbol and identifying a phase error of the symbol. For example, a phase error is represented as a shift or rotation in a constellation map. Phase estimates from received symbols may be used to produce better estimates for subsequently processed symbols. In certain examples, the operations of block 1015 is performed by the phase estimator 715 as described above with reference to FIG. 7.

Figure 11:
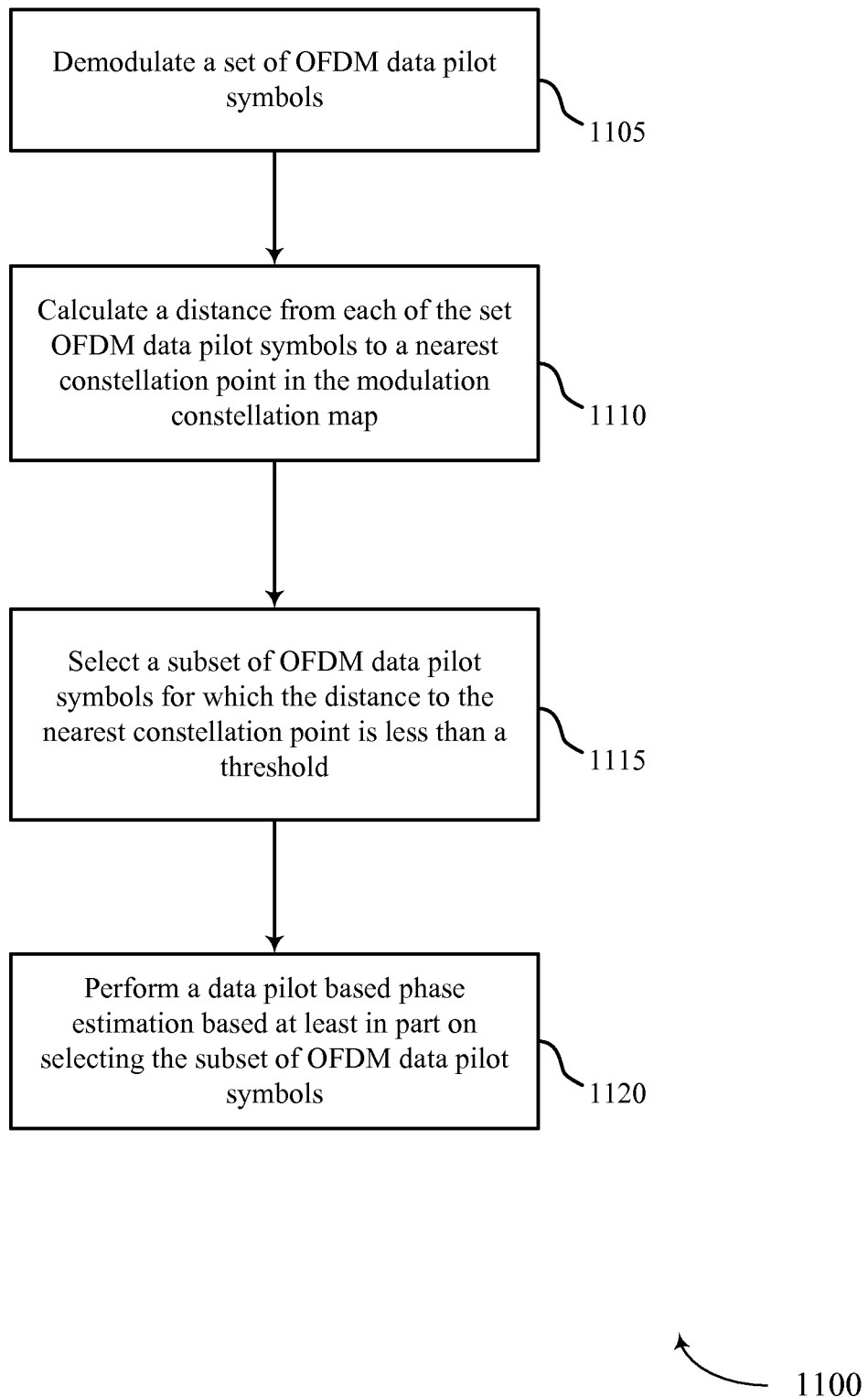
FIG. 11 illustrates a method for feed-forward phase tracking in accordance with various aspects of the present disclosure.

FIG. 11 shows a flowchart illustrating a method 1100 for feed-forward phase tracking in accordance with various aspects of the present disclosure. The operations of method 1100 is implemented by a device such as a STA 115 or an AP 105 or its components as described with reference to FIGS. 1-9. For example, the operations of method 1100 is performed by the phase tracker 610 as described with reference to FIGS. 6-9. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may demodulate a set of OFDM data-pilot symbols as described above with reference to FIGS. 2-5. In certain examples, the operations of block 1105 is performed by the demodulator 705 as described above with reference to FIG. 7. At block 1110, the device may calculate a distance from each of the set OFDM data-pilot symbols to a nearest constellation point in the modulation constellation map as described above with reference to FIGS. 2-5. In certain examples, the operations of block 1110 is performed by the symbol filter 710 as described above with reference to FIG. 7.

At block 1115, the device may select a subset of OFDM data-pilot symbols based at least in part on a position of each of the set of OFDM data-pilot symbols in a modulation constellation map as described above with reference to FIGS. 2-5. In some cases, selecting the subset of OFDM symbols includes selecting the subset of OFDM symbols for which the distance to the nearest constellation point is less than a threshold. Thus, the device may receive a number of data-pilot symbols and filter them for use in phase estimation. The filtering is based on each symbol's location within a constellation map, such as by discarding pilot symbols which do not fall within a threshold distance of an expected constellation point or do not fall within a defined region. In certain examples, the operations of block 1115 is performed by the symbol filter 710 as described above with reference to FIG. 7.

At block 1120, the device may perform a data-pilot-based phase estimation based at least in part on selecting the subset of OFDM data-pilot symbols as described above with reference to FIGS. 2-5. In certain examples, the operations of block 1120 is performed by the phase estimator 715 as described above with reference to FIG. 7.

Figure 12:
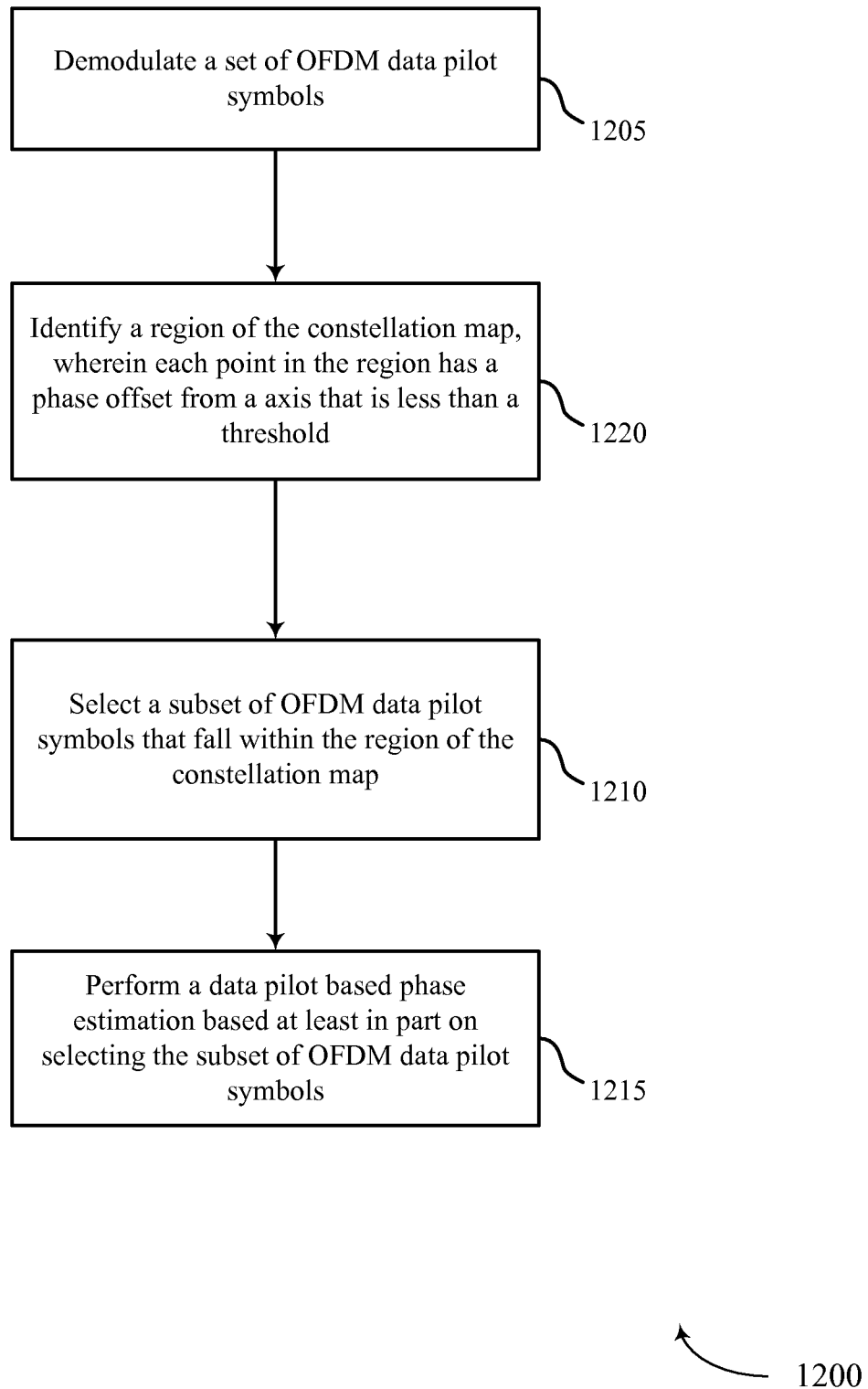
FIG. 12 illustrates a method for feed-forward phase tracking in accordance with various aspects of the present disclosure.

FIG. 12 shows a flowchart illustrating a method 1200 for feed-forward phase tracking in accordance with various aspects of the present disclosure. The operations of method 1200 is implemented by a device such as a STA 115 or an AP 105 or its components as described with reference to FIGS. 1-9. For example, the operations of method 1200 is performed by the phase tracker 610 as described with reference to FIGS. 6-9. In some examples, a device may execute a set of codes to control the functional elements of the device to perform the functions described below. Additionally or alternatively, the device may perform aspects the functions described below using special-purpose hardware. The method 1200 may also incorporate aspects of methods 1000, and 1100 of FIGS. 10-11.

At block 1205, the device may demodulate a set of OFDM data-pilot symbols as described above with reference to FIGS. 2-5. In certain examples, the operations of block 1205 is performed by the demodulator 705 as described above with reference to FIG. 7. At block 1210, the device may identify a region of the constellation map, wherein each point in the region has a phase offset from at least one axis that is less than a threshold as described above with reference to FIGS. 2-5. In certain examples, the operations of block 1210 is performed by the symbol filter 710 as described above with reference to FIG. 7.

At block 1215, the device may select a subset of OFDM data-pilot symbols based at least in part on a position of each of the set of OFDM data-pilot symbols in a modulation constellation map as described above with reference to FIGS. 2-5. Thus, the device may receive a number of data-pilot symbols and filter them for use in phase estimation. The filtering is based on each symbol's location within a constellation map, such as by discarding pilot symbols which do not fall within a threshold distance of an expected constellation point or do not fall within a defined region. In certain examples, the operations of block 1215 is performed by the symbol filter 710 as described above with reference to FIG. 7.

At block 1220, the device may perform a data-pilot-based phase estimation based at least in part on selecting the subset of OFDM data-pilot symbols as described above with reference to FIGS. 2-5. In some cases, selecting the subset of OFDM symbols includes selecting the subset of OFDM symbols that fall with the region of the constellation map. In certain examples, the operations of block 1220 is performed by the phase estimator 715 as described above with reference to FIG. 7.

Figure 13:
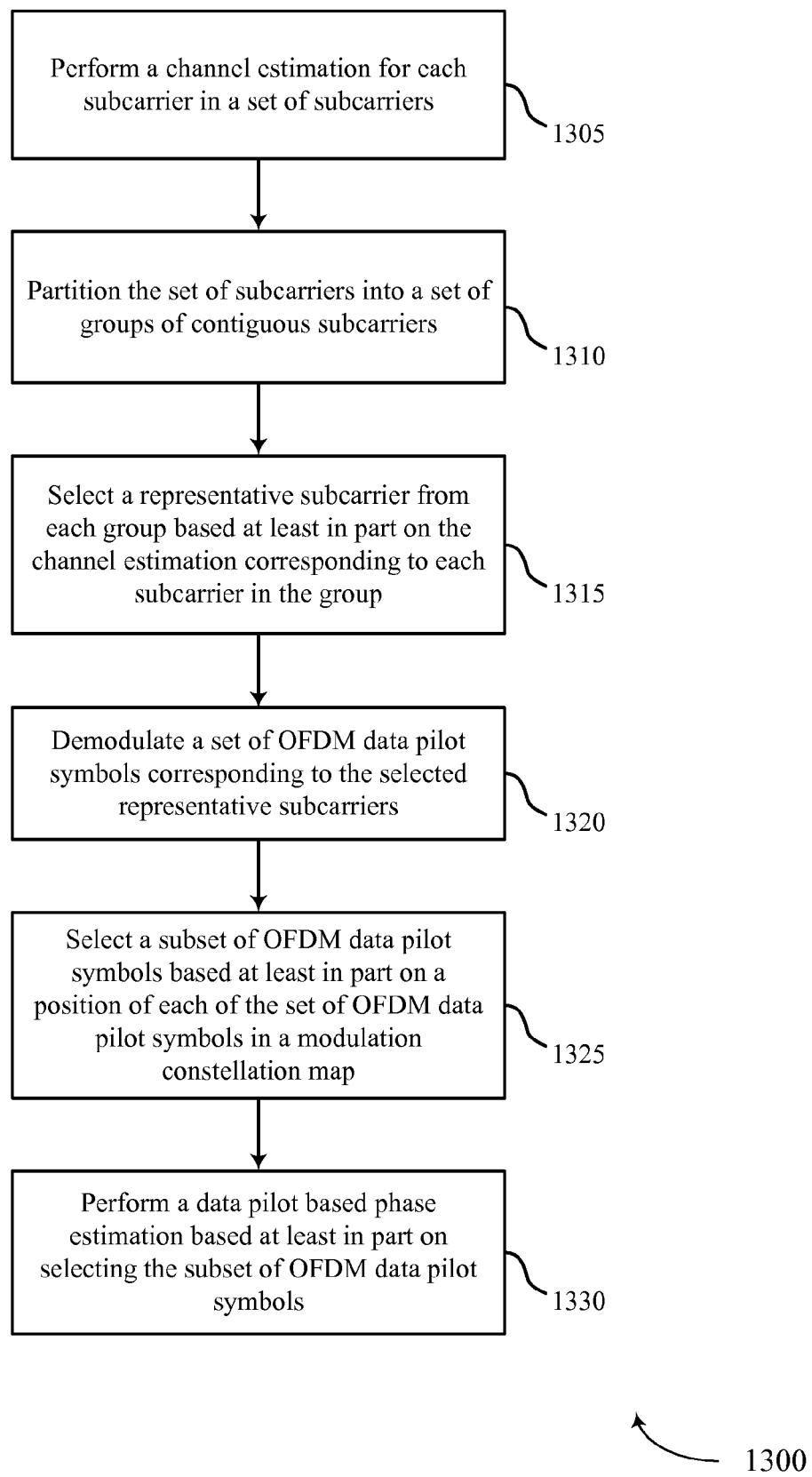
FIG. 13 illustrates a method for feed-forward phase tracking in accordance with various aspects of the present disclosure.

FIG. 13 shows a flowchart illustrating a method 1300 for feed-forward phase tracking in accordance with various aspects of the present disclosure. The operations of method 1300 is implemented by a device such as a STA 115 or an AP 105 or its components as described with reference to FIGS. 1-9. For example, the operations of method 1300 is performed by the phase tracker 610 as described with reference to FIGS. 6-9. In some examples, a device may execute a set of codes to control the functional elements of the device to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may demodulate a set of OFDM data-pilot symbols as described above with reference to FIGS. 2-5. In certain examples, the operations of block 1305 is performed by the demodulator 705 as described above with reference to FIG. 7.

At block 1310, the device may partition the set of subcarriers into a plurality of groups of contiguous subcarriers as described above with reference to FIGS. 2-5. For example, within each sub-block a number of subcarriers (e.g., a single subcarrier), may be selected for use in phase estimation. The pilot symbols of the selected subcarriers used for phase estimation may be chosen using a number of factors, such as the channel transfer function (i.e., the strength of the signal received on each subcarrier). For example, the pilot symbol with the greatest signal magnitude in the sub-block is filtered into the subset of pilot symbols 210 and therefore chosen for phase estimation. In certain examples, the operations of block 1310 is performed by the complexity reducer 950 as described above with reference to FIGS. 9A and 9B.

At block 1315, the device may select a representative subcarrier from each group based at least in part on the channel estimation corresponding to each subcarrier in the group as described above with reference to FIGS. 2-5. In certain examples, the operations of block 1315 is performed by the complexity reducer 950 as described above with reference to FIGS. 9A and 9B. At block 1320, the device may select a subset of OFDM data-pilot symbols based at least in part on a position of each of the set of OFDM data-pilot symbols in a modulation constellation map as described above with reference to FIGS. 2-5. The subset of OFDM data-pilot symbols may also be selected from the set of representative subcarriers. In certain examples, the operations of block 1320 is performed by the symbol filter 710 as described above with reference to FIG. 7.

At block 1325, the device may perform a data-pilot-based phase estimation based at least in part on selecting the subset of OFDM data-pilot symbols as described above with reference to FIGS. 2-5. In certain examples, the operations of block 1325 is performed by the phase estimator 715 as described above with reference to FIG. 7. At block 1330, the device may perform a channel estimation for each subcarrier in a set of subcarriers as described above with reference to FIGS. 2-5. In certain examples, the operations of block 1330 is performed by the complexity reducer 950 as described above with reference to FIGS. 9A and 9B.

Figure 14:
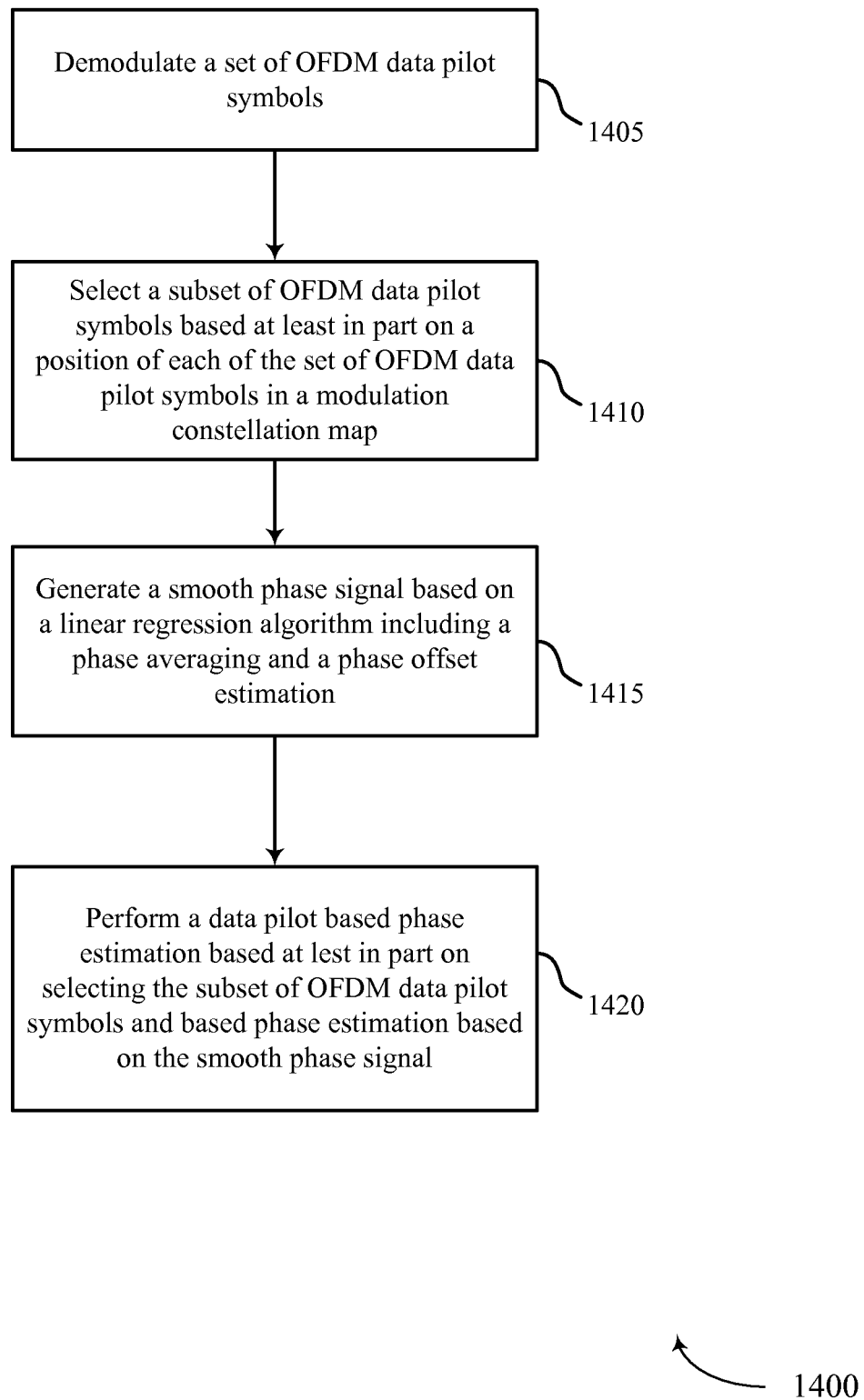
FIG. 14 illustrates a method for feed-forward phase tracking in accordance with various aspects of the present disclosure.

FIG. 14 shows a flowchart illustrating a method 1400 for feed-forward phase tracking in accordance with various aspects of the present disclosure. The operations of method 1400 is implemented by a device such as a STA 115 or an AP 105 or its components as described with reference to FIGS. 1-9. For example, the operations of method 1400 is performed by the phase tracker 610 as described with reference to FIGS. 6-9. In some examples, a device may execute a set of codes to control the functional elements of the device to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may demodulate a set of OFDM data-pilot symbols as described above with reference to FIGS. 2-5. In certain examples, the operations of block 1405 is performed by the demodulator 705 as described above with reference to FIG. 7.

At block 1410, the device may select a subset of OFDM data-pilot symbols based at least in part on a position of each of the set of OFDM data-pilot symbols in a modulation constellation map as described above with reference to FIGS. 2-5. In certain examples, the operations of block 1410 is performed by the symbol filter 710 as described above with reference to FIG. 7.

At block 1415, the device may generate a smooth phase signal based at least in part on a linear regression algorithm comprising a phase averaging and a phase offset estimation as described above with reference to FIGS. 2-5. In certain examples, the operations of block 1415 is performed by the linear regression filter 955 as described above with reference to FIGS. 9A and 9B.

At block 1420, the device may perform a data-pilot-based phase estimation based at least in part on selecting the subset of OFDM data-pilot symbols as described above with reference to FIGS. 2-5. In some cases, performing a data-pilot-based phase estimation includes: performing a data-pilot-based phase estimation based at least in part on the smooth phase signal. In certain examples, the operations of block 1420 is performed by the phase estimator 715 as described above with reference to FIG. 7.

Thus, methods 1000, 1100, 1200, 1300, and 1400 may provide for feed-forward phase tracking. It should be noted that methods 1000, 1100, 1200, 1300, and 1400 describe possible implementation, and that the operations and the steps may be rearranged or otherwise modified such that other implementations are possible. In some examples, aspects from two or more of the methods 1000, 1100, 1200, 1300, and 1400 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication, comprising: demodulating a set of OFDM data-pilot symbols;
   selecting a subset of OFDM data-pilot symbols from the set of demodulated OFDM data-pilot symbols for a data-pilot-based phase estimation, wherein the selecting is based at least in part on a position of each of the OFDM data-pilot symbols in a modulation constellation map relative to a mean symbol position: and
   performing the data-pilot-based phase estimation based at least in part on the selected subset of OFDM data-pilot symbols.

2. The method of claim 1, further comprising:
   calculating a distance from each of the OFDM data-pilot symbols to a nearest constellation point in the modulation constellation map; and
   wherein selecting the subset of OFDM data-pilot symbols comprises selecting OFDM data-pilot symbols for which the distance to the nearest constellation point is less than a threshold.

3. The method of claim 1, further comprising:
   identifying a region of the modulation constellation map, wherein each point in the region has a phase offset from at least one axis that is less than a threshold; and
   wherein selecting the subset of OFDM data-pilot symbols comprises selecting OFDM data-pilot symbols that fall within the region of the modulation constellation map.

4. The method of claim 1, further comprising:
   performing a channel estimation for each subcarrier in a set of subcarriers;
   partitioning the set of subcarriers into a plurality of groups of contiguous subcarriers; and
   selecting a representative subcarrier from each group based at least in part on the channel estimation corresponding to each subcarrier in the group.

5. The method of claim 1, further comprising:
   generating a smooth phase signal based at least in part on a linear regression algorithm comprising a phase averaging and a phase offset estimation; and
   wherein the data-pilot-based phase estimation is based at least in part on the smooth phase signal.

6. The method of claim 3, wherein the set of OFDM data-pilot symbols are demodulated using a modulation scheme selected from the group consisting of: binary phase shift keying (BPSK) and quadrature amplitude modulation (QAM); and wherein the at least one axis comprises an in-phase axis.

7. The method of claim 3, wherein the set of OFDM data-pilot symbols are demodulated using quadrature phase shift keying (QPSK); and wherein the at least one axis comprises an oblique axis.

8. An apparatus for communication, comprising: a demodulator for demodulating a set of OFDM data-pilot symbols;
   a symbol filter for selecting a subset of OFDM data-pilot symbols from the set of demodulated OFDM data-pilot symbols for a data-pilot-based phase estimation, wherein the selecting is based at least in part on a position of each of the OFDM data-pilot symbols in a modulation constellation map relative to a mean symbol position: and
   a phase estimator for performing the data-pilot-based phase estimation based at least in part on the selected subset of OFDM data-pilot symbols.

9. The apparatus of claim 8, further comprising:
   a first symbol filter for calculating a distance from each of the OFDM data-pilot symbols to a nearest constellation point in the modulation constellation map; and
   wherein selecting the subset of OFDM data-pilot symbols comprises selecting OFDM data-pilot symbols for which the distance to the nearest constellation point is less than a threshold.

10. The apparatus of claim 8, further comprising:
    a second symbol filter for identifying a region of the modulation constellation map, wherein each point in the region has a phase offset from at least one axis that is less than a threshold; and wherein selecting the subset of OFDM data-pilot symbols comprises selecting OFDM data-pilot symbols that fall within the region of the modulation constellation map.

11. The apparatus of claim 8, further comprising:

a complexity reducer for performing a channel estimation for each subcarrier in a set of subcarriers and for partitioning the set of subcarriers into a plurality of groups of contiguous subcarriers and for selecting a representative subcarrier from each group based at least in part on the channel estimation corresponding to each subcarrier in the group.

12. The apparatus of claim 8, further comprising:

a linear regression filter for generating a smooth phase signal based at least in part on a linear regression algorithm comprising a phase averaging and a phase offset estimation; and wherein the data-pilot-based phase estimation is based at least in part on the smooth phase signal.

13. The apparatus of claim 10, wherein the set of OFDM data-pilot symbols is demodulated using a modulation scheme selected from the group consisting of:

binary phase shift keying (BPSK) and quadrature amplitude modulation (QAM); and wherein the at least one axis comprises an in-phase axis.

14. The apparatus of claim 10, wherein the set of OFDM data-pilot symbols is demodulated using quadrature phase shift keying (QPSK); and wherein the at least one axis comprises an oblique axis.

15. An apparatus for communication, comprising: means for demodulating a set of OFDM data-pilot symbols;

means for selecting a subset of OFDM data-pilot symbols from the set of demodulated OFDM data-pilot symbols for a data-pilot-based phase estimation, wherein the selecting is based at least in part on a position of each of the OFDM data-pilot symbol in a modulation constellation map relative to a mean symbol position: and means for performing the data-pilot-based phase estimation based at least in part on the selected subset of OFDM data-pilot symbols.

16. The apparatus of claim 15, further comprising:

means for calculating a distance from each of the OFDM data-pilot symbols to a nearest constellation point in the modulation constellation map; and wherein the means for selecting the subset of OFDM data-pilot symbols comprises means for selecting OFDM data-pilot symbols for which the distance to the nearest constellation point is less than a threshold.

17. The apparatus of claim 15, further comprising:

means for identifying a region of the modulation constellation map, wherein each point in the region has a phase offset from at least one axis that is less than a threshold; and wherein the means for selecting the subset of OFDM data-pilot symbols comprises means for selecting OFDM data-pilot symbols that fall within the region of the modulation constellation map.

18. The apparatus of claim 15, further comprising:

means for performing a channel estimation for each subcarrier in a set of subcarriers;

means for partitioning the set of subcarriers into a plurality of groups of contiguous subcarriers; and means for selecting a representative subcarrier from each group based at least in part on the channel estimation corresponding to each subcarrier in the group.

19. The apparatus of claim 15, further comprising:

means for generating a smooth phase signal based at least in part on a linear regression algorithm comprising a phase averaging and a phase offset estimation; and wherein the data-pilot-based phase estimation is based at least in part on the smooth phase signal.

20. The apparatus of claim 17, wherein the set of OFDM data-pilot symbols is demodulated using a modulation scheme selected from the group consisting of: binary phase shift keying (BPSK) and quadrature amplitude modulation (QAM); and wherein the at least one axis comprises an imaginary axis.

* * * * *